US011321673B2

(12) United States Patent
Sun et al.

(10) Patent No.: US 11,321,673 B2
(45) Date of Patent: May 3, 2022

(54) METHOD AND SYSTEM FOR AUTOMATICALLY CREATING AN INSTANT AD-HOC CALENDAR EVENT

(71) Applicant: Samsung Electronics Co., Ltd., Suwon-si (KR)

(72) Inventors: Xiang Sun, Mountain View, CA (US); Allen Chao-Hung Cheng, Mountain View, CA (US); Peter King, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 293 days.

(21) Appl. No.: 15/800,646

(22) Filed: Nov. 1, 2017

(65) Prior Publication Data

US 2019/0130364 A1    May 2, 2019

(51) Int. Cl.
*G06Q 10/10* (2012.01)
*G06Q 50/00* (2012.01)
*H04W 88/02* (2009.01)
*H04M 1/72469* (2021.01)

(52) U.S. Cl.
CPC ......... *G06Q 10/1093* (2013.01); *G06Q 50/01* (2013.01); *H04M 1/72469* (2021.01); *H04W 88/02* (2013.01)

(58) Field of Classification Search
CPC .................................................. G06Q 10/10
See application file for complete search history.

(56) References Cited

U.S. PATENT DOCUMENTS

| 8,751,427 B1* | 6/2014 | Mysen | H04L 67/306 706/46 |
| 2003/0014292 A1* | 1/2003 | Strubbe | G06Q 10/109 702/178 |
| 2006/0265406 A1 | 11/2006 | Chkodrov et al. | |
| 2008/0033778 A1* | 2/2008 | Boss | G06Q 10/109 705/7.18 |
| 2008/0301737 A1 | 12/2008 | Hjelmeland Almas et al. | |
| 2009/0307212 A1* | 12/2009 | Ramot | G06Q 10/109 |

(Continued)

FOREIGN PATENT DOCUMENTS

| CN | 101682733 A | 3/2010 |
| CN | 104484796 A | 4/2015 |

(Continued)

OTHER PUBLICATIONS

ISA/KR, "International Search Report and Written Opinion of the International Searching Authority," International Application No. PCT/KR2018/013183, dated Feb. 8, 2019, 8 pages.

(Continued)

*Primary Examiner* — Kurtis Gills

(57) ABSTRACT

An electronic device, method, and non-transitory computer readable medium are provided for automatically creating an ad-hoc calendar event. The electronic device includes a memory and a processor coupled to the memory. The processor receives data including user information, venue information, and location information from a plurality of data sources; determines an interest above a predetermined threshold based on the received data; creates an event based on the determined interest and received data; and provides a recommendation of the created event to another electronic device.

20 Claims, 17 Drawing Sheets

(56) References Cited

U.S. PATENT DOCUMENTS

| | | | |
|---|---|---|---|
| 2010/0228590 A1* | 9/2010 | Muller | G06Q 30/02 |
| | | | 705/319 |
| 2013/0268886 A1 | 10/2013 | Sureshkumar | |
| 2014/0229416 A1 | 8/2014 | Bae et al. | |
| 2015/0019642 A1* | 1/2015 | Wang | H04L 67/306 |
| | | | 709/204 |
| 2015/0161671 A1 | 6/2015 | Watkeys | |
| 2015/0178690 A1 | 6/2015 | May et al. | |
| 2015/0178779 A1 | 6/2015 | Malone et al. | |
| 2016/0119751 A1 | 4/2016 | Park et al. | |
| 2016/0234595 A1* | 8/2016 | Goran | H04R 3/002 |
| 2016/0342951 A1 | 11/2016 | Ryu et al. | |
| 2016/0358127 A1* | 12/2016 | Daboo | G06Q 10/1095 |
| 2017/0034108 A1* | 2/2017 | Fechete | H04L 51/32 |
| 2017/0093967 A1 | 3/2017 | Grosz | |
| 2017/0098197 A1* | 4/2017 | Yu | G06Q 30/02 |
| 2017/0269792 A1 | 9/2017 | Xu et al. | |

FOREIGN PATENT DOCUMENTS

| | | |
|---|---|---|
| CN | 104917669 A | 9/2015 |
| EP | 2993639 A1 | 3/2016 |
| KR | 10-2016-0137455 A | 11/2016 |
| WO | 2012138574 A1 | 10/2012 |

OTHER PUBLICATIONS

Madden, Mary et al.; "Teens, Social Media, and Privacy"; Pew Research Center; May 21, 2013; 11 pages.

Smith, Aaron; "U.S. Smartphone Use in 2015"; Pew Research Center; Apr. 1, 2015; 5 pages.

Lenhart, Amanda; "Mobile Access Shifts Social Media Use and Other Online Activities"; Pew Research Center; Apr. 9, 2015; 24 pages.

Office Action dated Dec. 3, 2020 in connection with Chinese Patent Application No. 201880067659.5, 15 pages.

* cited by examiner

METHOD AND SYSTEM FOR AUTOMATICALLY CREATING AN INSTANT AD-HOC CALENDAR EVENT

TECHNICAL FIELD

This disclosure relates generally to calendar events. More specifically, this disclosure relates to automatically creating an ad-hoc calendar event.

BACKGROUND

The Millennial generation is more connected via mobile devices than ever. More than 90% of younger smartphone owners in the United States rely on using their smartphones to find things to do or people to interact with when they feel bored. More often than not, people may not have a good idea of knowing what exactly they are looking to do or people to do things with when they are bored. Creating an event on existing calendar applications requires deliberate planning and user execution.

SUMMARY

This disclosure provides for automatically creating an ad-hoc calendar event.

In a first embodiment, an electronic device provides for automatically creating an ad-hoc calendar event. The electronic device includes a transceiver and a processor coupled to the transceiver. The processor receives data including user information, venue information, and location information from a plurality of data sources; determines an interest above a predetermined threshold based on the received data; creates an event based on the determined interest and received data; and provides a recommendation of the created event to another electronic device.

In a second embodiment, a method provides for automatically creating an ad-hoc calendar event. The method includes receiving data including user information, venue information, and location information from a plurality of data sources; determining an interest above a predetermined threshold based on the received data; creating an event based on the determined interest and received data; and providing a recommendation to the created event to another electronic device.

In a third embodiment, a non-transitory medium embodying a computer program provides for automatically creating an ad-hoc calendar event. The program code, when executed by at least one processor, causes a processor to receive data including user information, venue information, and location information from a plurality of data sources; determine an interest above a predetermined threshold based on the received data; create an event based on the determined interest and received data; and provide a recommendation to the created event to another electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
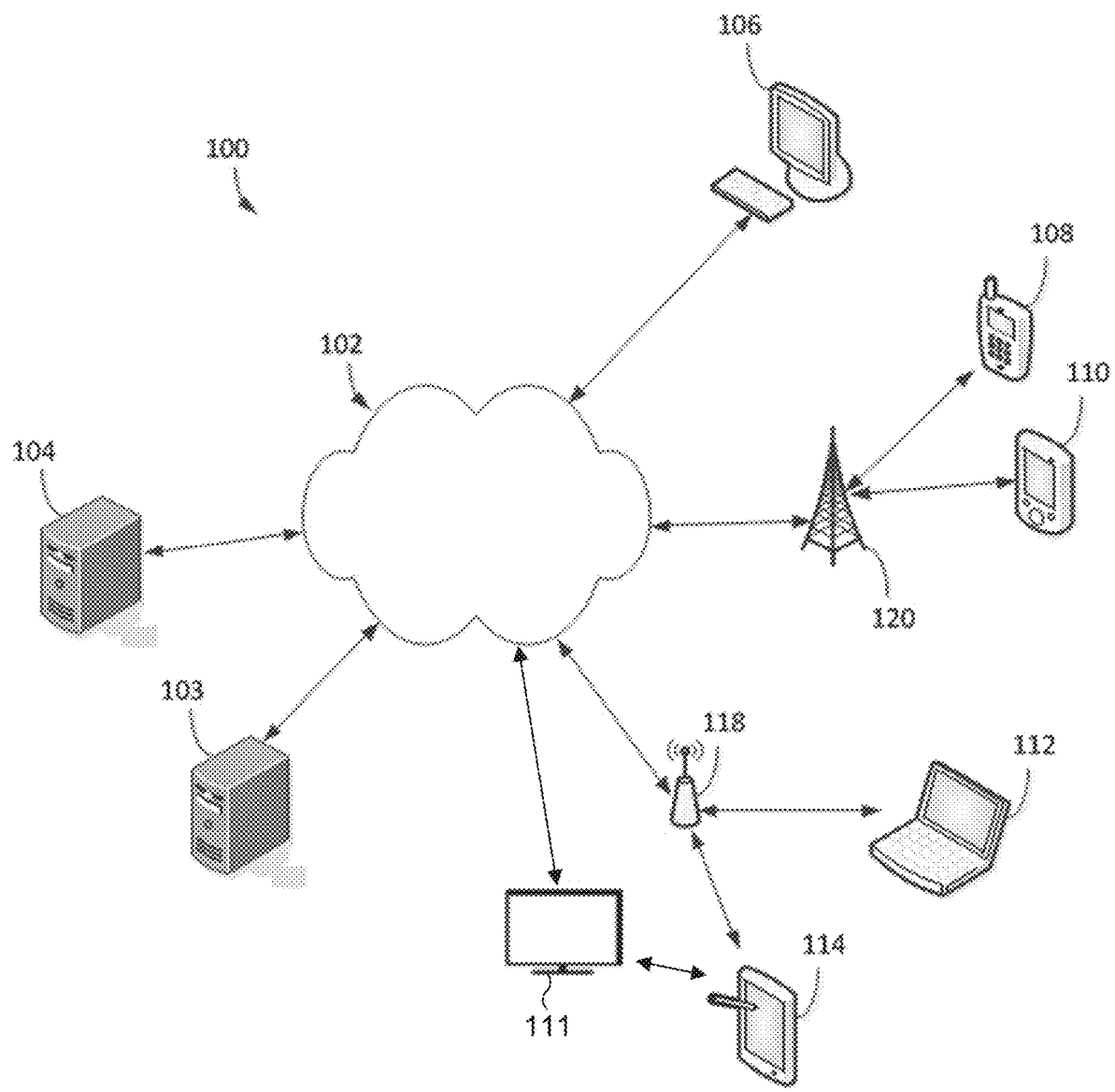
FIG. 1 illustrates an example communication system in which various embodiments of the present disclosure may be implemented.

FIGS. 1 through 18, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged Internet of things system.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device can be a smart home appliance. Examples of the smart home appliance include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., SAMSUNG HOMESYNC, APPLE TV, or GOOGLE TV), a gaming console (XBOX, PLAY- STATION), an electronic dictionary, an electronic key, a camcorder, or an electronic picture frame.

According to an embodiment of the present disclosure, examples of the electronic device include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device can be at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the electronic device may be one or a combination of the above-listed devices. According to an embodiment of the present disclosure, the electronic device is a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 can communicate Internet Protocol (IP) packets, frame relay frames, or other information between network addresses. The network 102 can include one or more local area networks (LANs); metropolitan area networks (MANs); wide area networks (WANs); all or a portion of a global network, such as the Internet; or any other communication system or systems at one or more locations.

The network 102 facilitates communications between various servers 103 and 104 and various electronic devices 106-114. Each server 104 includes any suitable computing or processing device that can provide computing services for one or more electronic devices. Each server 104 could, for example, include one or more processors, one or more memories storing instructions and data, and one or more network interfaces facilitating communication over the network 102.

Each electronic device 106-114 represents any suitable computing or communication device that interacts with at least one server or other computing device(s) over the network 102. In this example, the electronic devices 106-114 include electronic devices, such as, for example, a desktop computer 106, a mobile telephones or smartphones 108, a personal digital assistant (PDA) 110, a smart television 111, a laptop computer 112, a smart speaker 113, a tablet computer 114, a headset, a display, a wearable device, smart watch, and the like However, any other or additional electronic devices could be used in the communication system 100.

In this example, some electronic devices 108-114 communicate indirectly with the network 102. For example, the electronic devices 108-110 communicate via one or more base stations 120, such as cellular base stations or eNodeBs. Also, the electronic devices 112-114 communicate via one or more wireless access points (APs) 118, such as IEEE 802.11 wireless APs, Bluetooth, and WiFi direct. Note that these are for illustration only and that each electronic device could communicate directly with the network 102 or indirectly with the network 102 via any suitable intermediate device(s) or network(s). For example, the television 111 and speaker 113 could communicate with the tablet computer 114 over a Bluetooth connection and communicate with other devices including the servers 103 and 104 over Wi-Fi.

As described in more detail below, the electronic devices 108-114 interact for automatically creating an instant ad-hoc calendar event. While electronic devices 108-114 are described as automatically creating an instant ad-hoc calendar event, servers 103 and 104 could also be utilized for automatically creating an instant ad-hoc calendar event.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
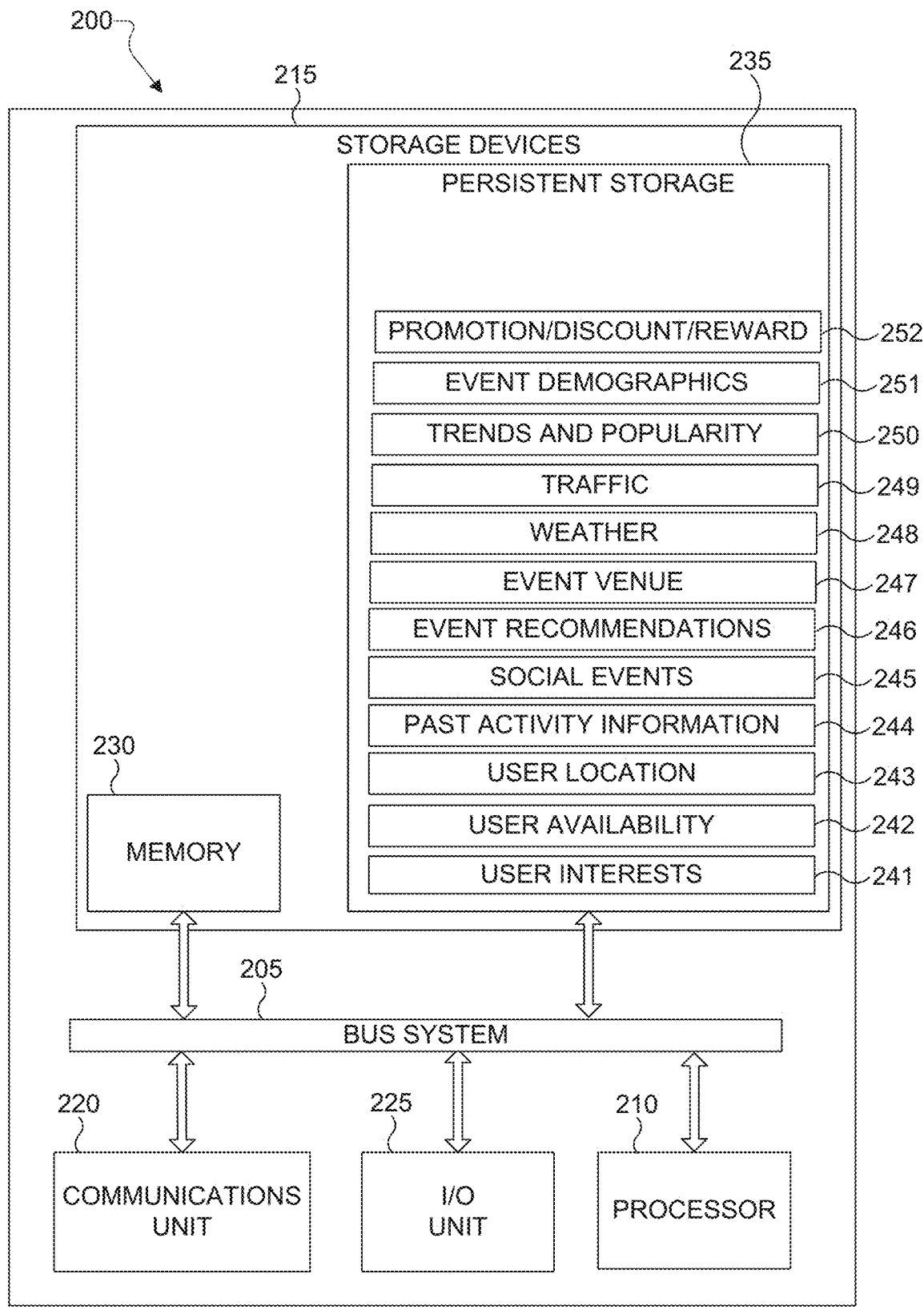
FIG. 2 illustrates an example server according to embodiments of the present disclosure.
Figure 3:
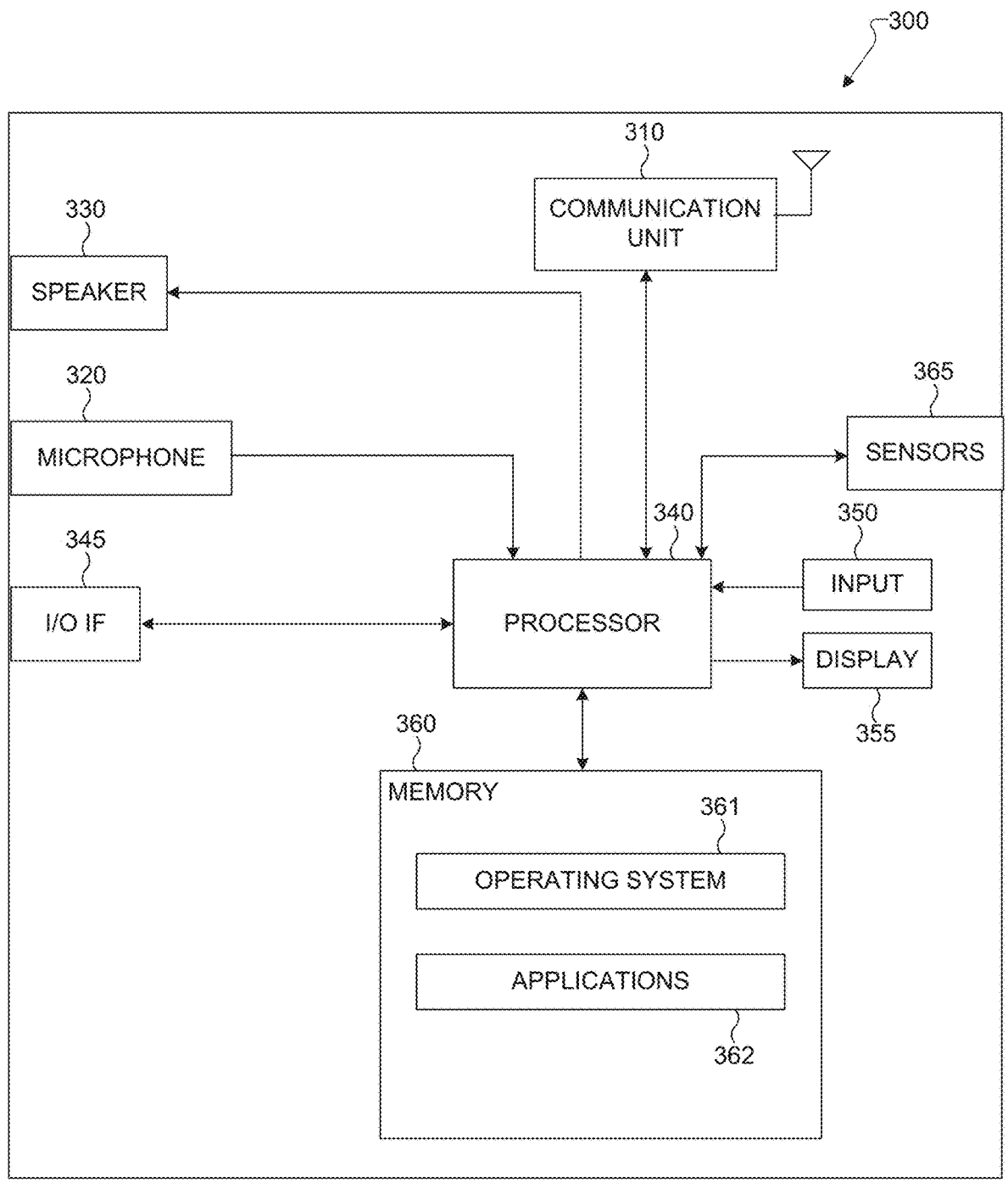
FIG. 3 illustrates an example electronic device according to embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. The server 200 could represent the server 103 or the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one communications unit 220, and at least one input/output (I/O) unit 225.

The processor 210 executes instructions that can be loaded into a memory 230. The processor 210 can include any suitable number(s) and type(s) of processors or other devices in any suitable arrangement. Example types of processor 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, flash memory, or optical disc. The persistent storage 235 can includes user interests 241, user availability 242, location 243 of users, past activity information 244 of users, social events 245 of users, event recommendations 246 of users, event venues 247, weather 248, traffic 249, trends and popularity 250 of events, event demographics 251, and promotion/discount/rewards 252 for events. The users' location 243 includes the current location, past location history, and projected locations. The user availability 242 includes free and busy slots marked on a calendar. The users' interest 241 includes interest explicitly specified through a user profile and preference settings; interest implicitly inferred by an event acceptance, rejection history, emails, or message and browser traffic; and common interests shared among friends. The past activity information 244 includes characteristics and attributes of past accepted, rejected, or dismissed events, with detail such as event location, event type, event venue, event weather, time of the day, day of the week, list of invitees, list of attendees, list of friends that attended, and the like; event acceptance, rejection and dismiss rates, such as including the overall statistics as well as a breakdown according to each event characteristic and attribute; and event no show rates, such as including the overall statistics as well as a breakdown according to each event characteristic and attribute and also showing event or activities in lieu of initially accepted events. A user's social graph or social event 245 information includes lists of current friends marked with degrees of separation, lists of friend whom the user has went to the same events with in the past, lists of non-friends whom the user has went to the same events with in the past; and lists of friends who share the common interest with the user, and the like. The event venue 247 information includes a list of events at the venue marked with corresponding event types; rating information; characteristics and attributes such as location, event type, availability information, reservation information, maximum occupancy, crime history, cost, and the like. The weather 248 information includes weather forecast of the user's current location, weather forecast of the event venue location, and the like. The traffic 249 information includes estimated time of arrival from the user's current location to the event location, traffic and accident information in the region, and the like. The trends and popularity 250 information includes frequency or scarcity of the event, such as event frequency or scarcity city-wide, region-wide, state-wide, nation-wide, and the like. The event demographics 251 information includes age, gender, and the like. The promotion/discount/reward 252 information includes if user has unclaimed benefits from a rewards program or other eligible promotions the user can claim. Multiple beneficial promotions can be considered for a single event.

The communications unit 220 supports communications with other systems or devices. For example, the communications unit 220 could include a network interface card or a wireless transceiver facilitating communications over the network 102. The communications unit 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 also can send output to a display, printer, or other suitable output device.

As described in more detail below, the processor 210 automatically creates an instant ad-hoc calendar event. The electronic device 200 stores and tracks user interests 241, user availability 242, user location 243, and past activity information 244. Anytime the server 200 detects there are multiple users actively seeking things to do (e.g., actively using and interacting with the mobile app such as browsing event recommendations 246), the server 200 automatically creates and recommends an ad-hoc social event 245 which users can take action immediately or in the very near future. The server 200 determines whether to make an event recommendation 246 to a social event 245 based on the users meeting certain conditions, such as a group of users in physical proximity to each other, a group of users sharing a common interest, and a group of users without an existing social event 245 currently on the user's calendars.

Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the electronic device 300 includes an antenna 305, a communication unit 310, transmit (TX) processing circuitry 315, a microphone 320, and receive (RX) processing circuitry 325. The electronic device 300 also includes a speaker 330, a processor 340, an input/output (I/O) interface (IF) 345, an input 350, a display 355, and a memory 360. The memory 360 includes an operating system (OS) program 361 and one or more applications 362.

The communication unit 310 may receive an incoming RF signal such as a Bluetooth® or Wi-Fi® signal. The communication unit 310 may down-convert the incoming RF signal to generate an intermediate frequency (IF) or baseband signal, then generate a processed baseband signal by filtering, decoding, and/or digitizing the baseband or IF signal. The communication unit 310 transmits the processed baseband signal to the processor 340 for further processing (such as for web browsing data, online gameplay data, notification data, or other message data).

The communication unit 310 also receives analog or digital voice data or other outgoing baseband data (such as web data, e-mail, or interactive video game data) from the processor 340. The communication unit 310 encodes, multiplexes, and/or digitizes the outgoing baseband data to generate a processed baseband or IF signal. In the case that the communication unit 310 is an RF transceiver, the communication unit 310 up-converts the baseband or IF signal to an RF signal that is transmitted via an antenna.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310 in accordance with well-known principles. The processor 340 could also receive analog or digital voice data from the microphone 320, and output analog or digital audio to the speaker 330. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS program 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input 350 and the display 355. The operator of the electronic device 300 can use the input 350 (e.g., keypad, touchscreen, button and the like) to enter data into the electronic device 300. The display 355 can be a liquid crystal display, a light-emitting diode (LED) display, an optical LED (OLED), an active matrix OLED (AMOLED), or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the processor 340 automatically creates an instant ad-hoc calendar event. The electronic device 300 automatically creates an instant ad-hoc calendar event.

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, electronic devices and servers can come in a wide variety of configurations, and FIGS. 2 and 3 do not limit this disclosure to any particular electronic device or server.

Figure 4:
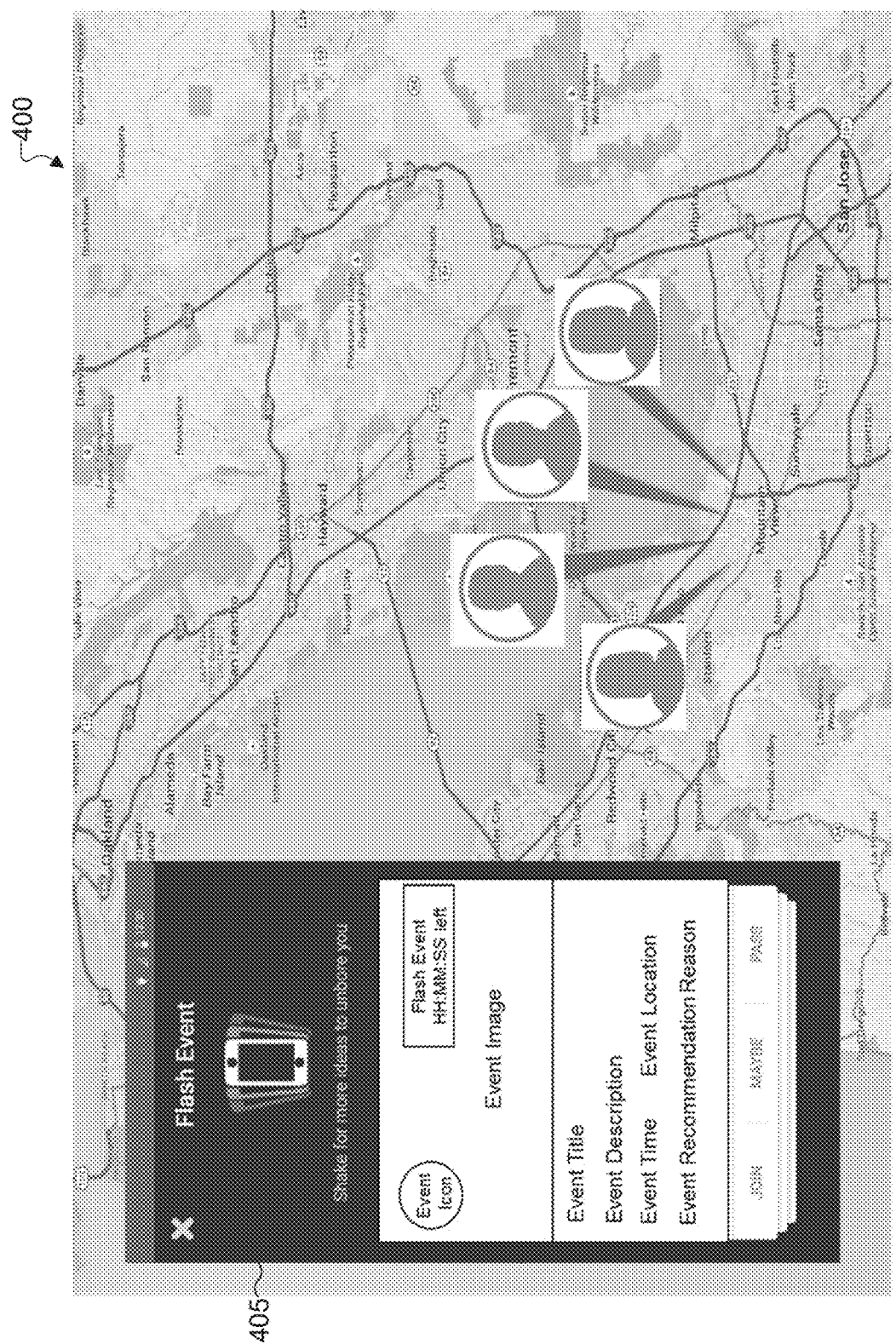
FIG. 4 illustrates an example event recommendation according to embodiments of the present disclosure.

FIG. 4 illustrates an example event recommendation 400 according to embodiments of the present disclosure. The embodiment of the event recommendation 400 illustrated in FIG. 4 is for illustration only. FIG. 4 does not limit the scope of this disclosure to any particular embodiment of an event recommendation. The event recommendation 400 is an example that presents a user interface 405 with the recommendation for a group of people located in proximity to each other.

With the on-demand automatic new event creation capability this application provides creation of a new competitive social service with unlimited supply of events that is different from existing solutions. This application applies machine learning/AI techniques to continuously improve the relevance of recommended events by learning the user's behaviors and tailoring recommendations to their interests, availability, and current locations. Relevant events with higher probability of user acceptance are pushed to users first; whereas events with lower user acceptance are pushed later or not recommended at all. This application features an intuitive user interface (UI) 405 that presents recommended events in the user's open time slots allowing users to make acceptance decision more easily.

Users use the mobile application. Users then set their event interests. Users' approximate locations and near-term availabilities are synced to the server as they are using the mobile application. The server builds a feature vector for each user using location, availability, interests, and past in-app activity patterns. The server updates search indices with the feature vector.

The scheduler running in the server schedules the multi-dimensional match algorithm on the indices and group users based on their location, interest and availability. Once the mobile application finds a group of active users who are close with one another, sharing the common interests, and are available, the mobile application then creates an event for this group of users (e.g., a pickup soccer game for people like playing soccer).

As part of this new event recommendation, the server suggests an appropriate venue suitable for this type of event and is close to all users. As each user decides to attend or pass the recommended event, the server stores the feedback and records his or her activity pattern to provide more targeted input to feature vector in the future.

During event creation process, if there are multiple events to recommend to users, the server applies machine learning/AI techniques to rank events based on their acceptance likelihood. Events with higher probability of acceptance will be pushed to users first; whereas events with lower probability of acceptance will be pushed to users later or not at all. The benefits of this applying this algorithm is to increase the relevance of the recommendations hence user satisfaction while avoid spamming users with less relevant events.

Figure 5:
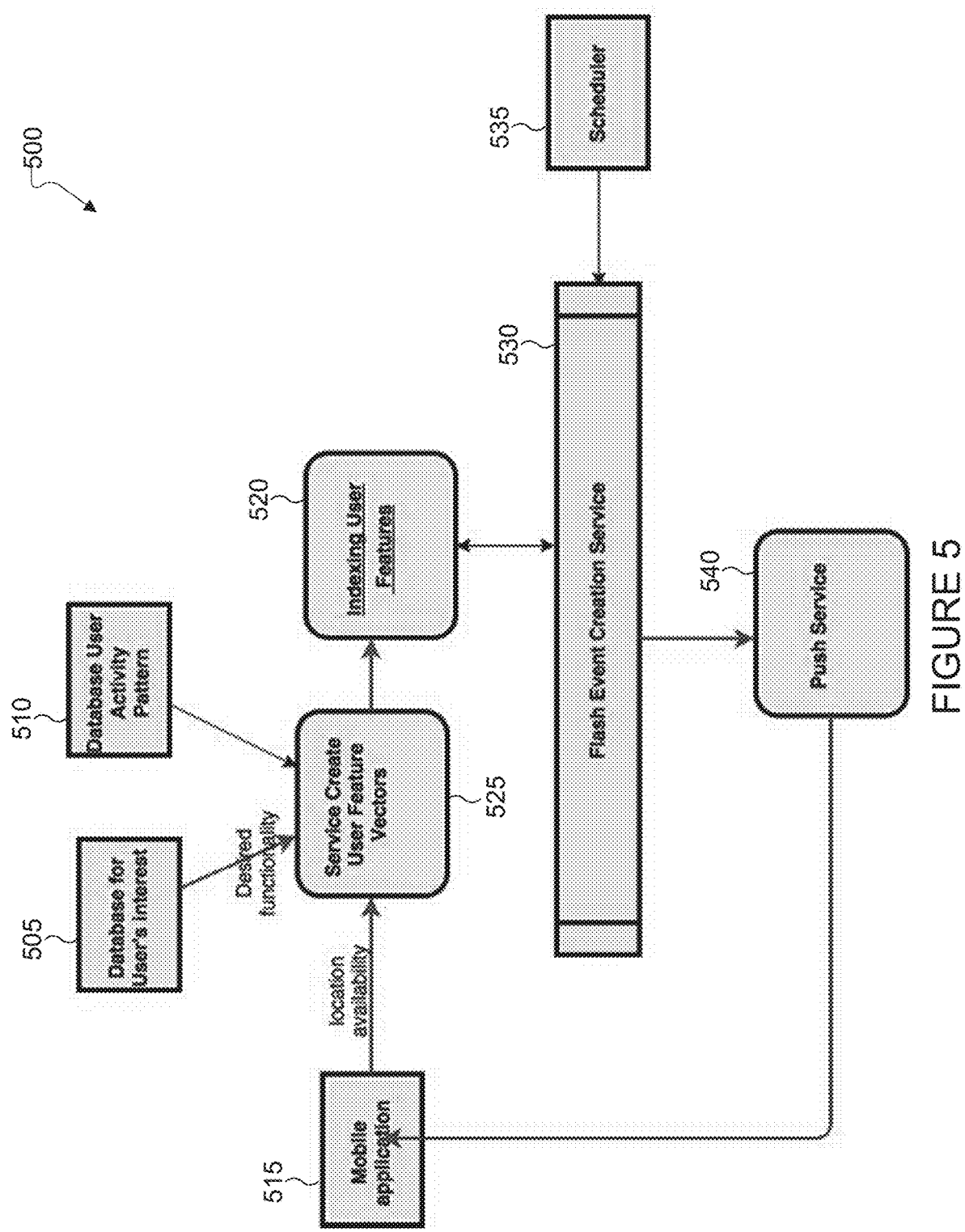
FIG. 5 illustrates an example server block diagram according to embodiments of the present disclosure.

FIG. 5 illustrates an example server 500 block diagram according to embodiments of the present disclosure. The embodiment of the server 500 illustrated in FIG. 5 is for illustration only. FIG. 5 does not limit the scope of this disclosure to any particular embodiment of a server.

The server 500 is for automatically creating an ad-hoc calendar event. The server 500 includes a user interest database 505, a user activity pattern database 510, a mobile application 515, user features index 520, a service circuitry 525 for creating user feature vectors, flash event creation service circuitry 530, scheduler circuitry 535, and push service circuitry 540.

The server 500 can detect users actively seeking things to do. The server 500 determines whether users are actively seeking things to do based on their current interactions with the corresponding mobile app, such as viewing, shaking, swiping, tapping, typing, or performing other user actions. The server 500 determine whether users are actively seeking things to do based on an appropriately specified minimum duration users have been actively interacting with the corresponding mobile app.

The server 500 matches active users based on current location interests, availability, and past history. The server 500 partitions active users based on their geographic locations. The server 500 derives user interests based on past event participation history and user explicit specified interests. The server 500 derives user availability based on integration of other calendar services and user explicitly specified availability. The server 500 derives a current user location based on the default mobile device location service (e.g., GPS/WiFi/Cellular tower) and the user's in app activities (e.g. check-in).

The server 500 determines an appropriate frequency and quantity for creating new events based on the fill rate of created events as feedback. The server 500 determines an appropriate event start time based on the current time, anticipated user travel times, and user availability. The server 500 determines an appropriate event duration based on the event category, venue availability, and user availability. The server 500 determines an appropriate event venue based on the event category, user current locations, venue availability, and weather.

The server 500 determines an appropriate event category based on user interests. If there are multiple event category candidates to choose from and uses the following criteria prioritize the event category, such as event category that yields the largest group of recipients or an event category that yields the closest suggest venues to recipient's current location. The server 500 determines an appropriate number of event invitees based on event category and the venue capacity. The server 500 can purchase an admission ticket for the suggested events or makes reservations for the suggested venue using the mobile payment service.

The server 500 processes user data collection. The mobile device proactively pushes the updated data to the server when the change is significantly enough (e.g., exceeds a pre-determined threshold value). The server 500 periodically polls the mobile device and check if there is any data updates. The frequency of polling is dynamically adjusted based on the busyness the server, the mobile device, and the current network traffic. To conserve the energy and network data usage, the mobile device may perform batch transfer (i.e., accumulated multiple data transfer and do them at the same time when the mobile device, the server, the network are less busy).

The server 500 performs user discovery of personalized event recommendations in the calendar. The mobile device shows recommended events in user's open time slots among other calendar events. The mobile device shows all recommended events that fit user's interests in a separate UI view.

The server 500 performs event creations that encompass both physical and virtual events. Physical events are events held in a physical venues, e.g., sports, social outing. Virtual events are events held in a virtual cyber space, e.g., Virtual Reality meetups, gaming.

The server 500 performs ranking for the recommended events. The server 500 ranks recommended events based on the likelihood the users will accept and attend them. A mathematic model represents the likelihood of the event success rate. A training process with which the mathematic model is trained based on the past event occurrence history. Recommended events with highest probability of success will be pushed to users first whereas events with lower probability of success will be pushed later or not at all.

The server 500 provides intelligent notifications. The mobile device, incorporated with an intelligent notification engine (INE) provides notifications of each event intelligently to the user based on one or more of the following contexts: 1) user context, such as the user state (e.g., driving, cycling, jogging, walking, exercising, standing, sleeping, and the like), the user location (e.g., home, office, restaurants, public space, and the like); 2) device context, such as the mobile device form factor (e.g., phone, watch, glasses, tablet, HMD, and the like) and how the user is using the mobile device (e.g., taking a call, using apps, idling, and the like); and 3) ambient context (e.g., sound, light, temperature, humidity, and the like) alternative embodiment is to have the INE be incorporated in the server 500, which also receives from the client one or more contexts, i.e., user context, device context, ambient context, and push notifications directly to the user with meta information specifying how these notifications should be formatted on the mobile device.

The server 500 provides the intelligent notifications in cases if the user is not in a state ready to consume full text notifications (e.g. driving, cycling, and the like), the INE will automatically reformat the content of the notification to a form that is better for consumption, such as larger icons or other representative image showing relative information or bigger and more concise texts. If the user is not in a state to be disturbed (e.g., sleeping, taking a call, in a meeting, in a quiet public library), the INE will automatically mute the notification and insert it into a queue for later consumption to make it less interruptive to the user.

The INE can signal the user there is a notification by flashing the mobile device LED or displaying an icon in its status bar. If the user is about to arrive or already arrived at the event venue, the INE can check with the server 500 to see how many other event invitees have also arrived and notify the user accordingly. If the user is in a public space where the ambient sounds are too loud for the user to hear the default notification alert, the INE can automatically increase the alert volume, change to a more noticeable alert tone, and/or turn on the vibration. If the user is in the hot and humid environment where the user may not be in a mood or is unable to focus on consuming full text notification or not to consume notification at all, the INE can either reformat the notification into a briefer form (e.g., image only, bigger and concise texts) or queue up the notification until the user is in a more comfortable environment.

If the ambient light exceeds a predefined level, the INE can automatically inform the Mobile Device to turn on reflective mode if it is equipped with a reflective or transflective display; otherwise, the INE can atomically increase the display brightness to a predefined level to increase the notification readability.

The server 500 provides for future estimation of a user related to events. The server 500, incorporated with a future estimation engine (FEE), can estimate the user's future state such as physiological condition, location, availability and adjust event recommendations to tailor user's predicted future state accordingly. An alternative embodiment has the FEE incorporated in the mobile device, which can send the user's predicted future state to the server 500.

If the user has just attended a physically demanding event (e.g., marathon, cross country hiking), the server 500 can estimate the user will likely have fatigue therefore can recommend the user to visit his/her favorite massage parlors, restaurants, or other similar activities. If the user commits to an event that is outside of his/her typical "home area" (e.g., an out-of-state concert event, a long weekend ski trip) for specific dates in the future, the server 500 can estimate the user will likely remain outside of his/her home area during the duration of the events and thus recommend events/activities/venues that are close to the locations nearby to the user. The server 500 takes into account the travel time it takes the user to go to/return from a committed event and estimate that the user will not be available for other events/activities during those travel times.

Figure 6:
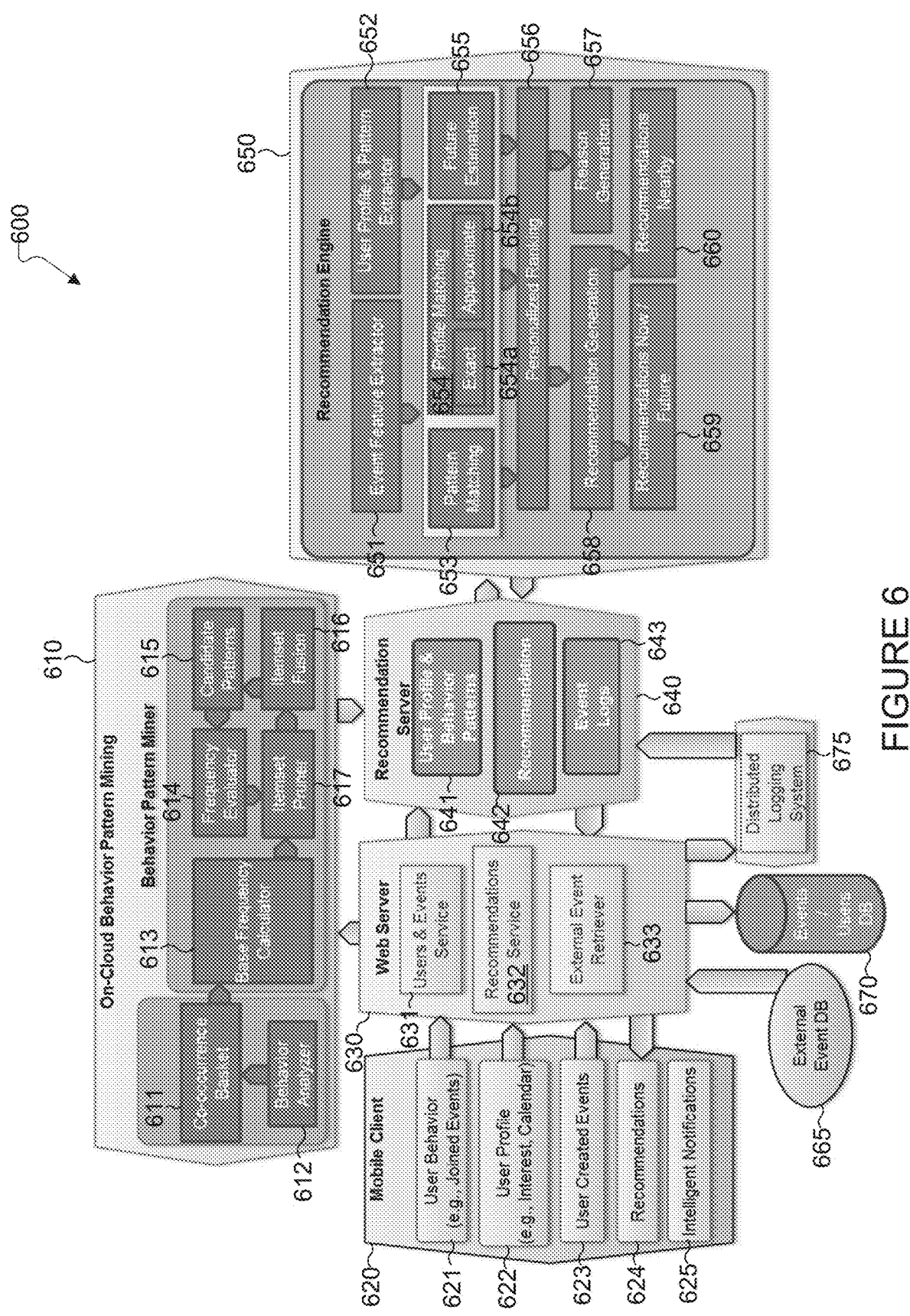
FIG. 6 illustrates an example server architecture according to embodiments of the present disclosure.

FIG. 6 illustrates an example server architecture 600 according to embodiments of the present disclosure. The embodiment of the server architecture 600 illustrated in FIG. 6 is for illustration only. FIG. 6 does not limit the scope of this disclosure to any particular embodiment of a server architecture.

The server architecture 600 provides for automatically creating an ad-hoc calendar event. The server architecture 600 includes on-cloud behavior pattern mining 610, a mobile client 620, web server 630, recommendation server 640, a recommendation engine 650, an externa event DB 665, an event/user database 670, and a distributed logging system 675.

The on-cloud behavior pattern mining 610 includes a co-occurrence basket 611, a behavior analyzer 612, a base frequency calculator 613, frequency evaluator 614, candidate patterns 615, itemset fusion 616, and itemset pruner 617.

The mobile client 620 includes a user behavior 621, user profile 622, user created events 623, recommendations 624, intelligent notifications 625.

The web server 630 includes user & events service 631, recommendations service 632, and external event retriever 633.

The recommendation server 640 includes a user profile & behavior patterns 641, recommendations 642, and event logs 643.

The recommendation engine 650 includes an event feature extractor 651, a user profile & pattern extractor 652, pattern matching 653, profile matching 654 (exact profile matching 654a and approximate profile matching 654b), future estimation 655, personalized ranking 656, reason generation 657, recommendation generation 658, recommendations now/future 659, and recommendation nearby 660.

Figure 7:
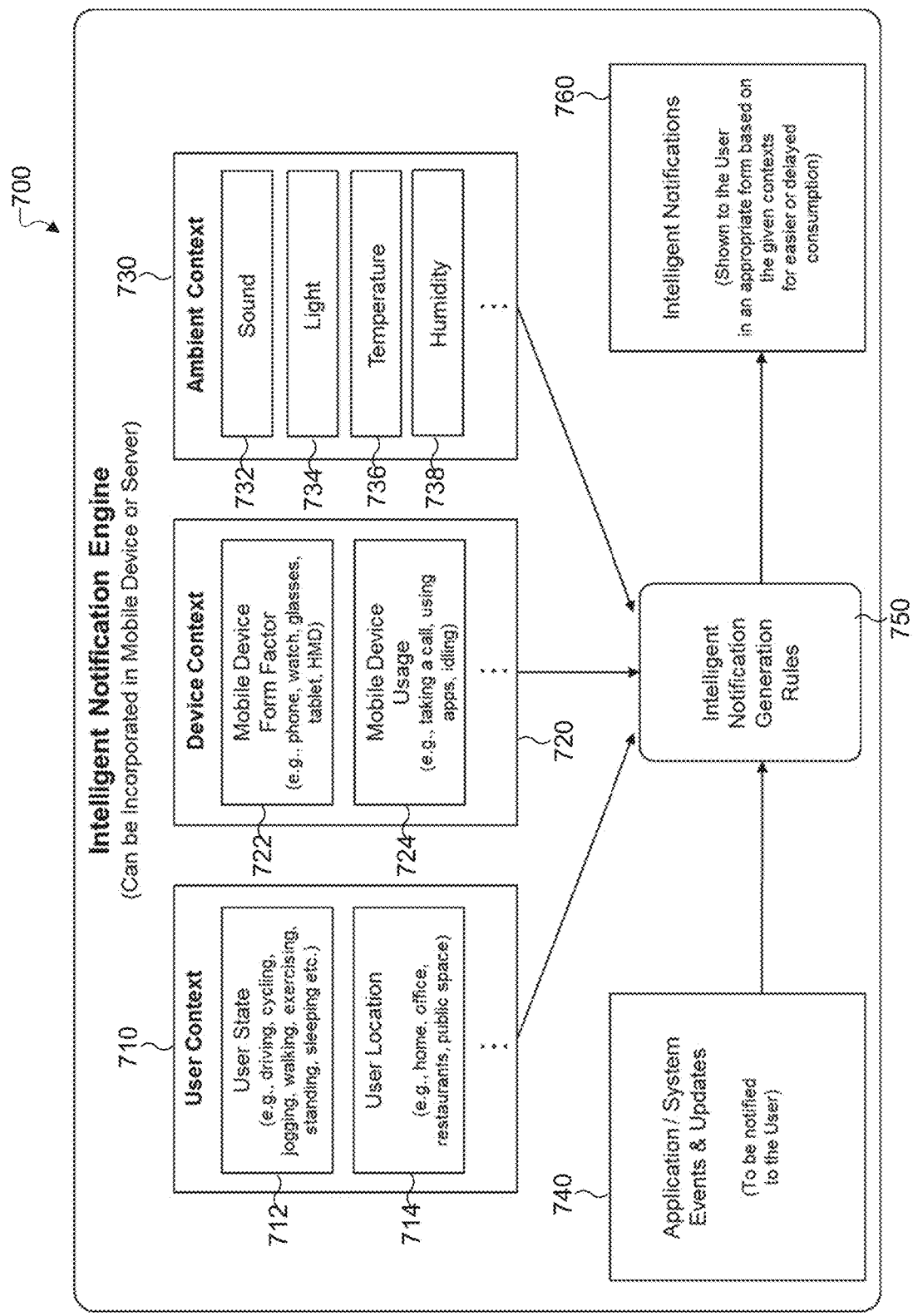
FIG. 7 illustrates examples intelligent notification engine block diagram according to embodiments of the present disclosure.

FIG. 7 illustrates examples intelligent notification engine 700 block diagram according to embodiments of the present disclosure. The embodiment of the intelligent notification engine 700 illustrated in FIG. 7 is for illustration only. FIG. 7 does not limit the scope of this disclosure to any particular embodiment of an intelligent notification engine.

The intelligent notification engine 700 determines a status of an electronic device to determine how to provide a notification. The intelligent notification engine 700 includes user context 710, device context 720, ambient context 730, application/system events & updates 740, intelligent notification generation rules 750, and intelligent notifications 760.

The user context 710 includes a user state 712 and a user location 714. The user can be, for example, driving, cycling, jogging, waking, exercising, standing, sleeping, and the like. The user location can be, for example, a home, an office, a restaurant, a public space, and the like.

The device context 720 includes a mobile device form factor 722 and a mobile device usage 724. The mobile device form factor 722 can be, for example, a phone, a watch, a glasses, a tablet, a head mounted device (HMD). The mobile device usage 724 can be, for example, taking a call, using an app, idling, and the like.

The ambient context 730 includes sounds 732, light 734, temperature 736, and humidity 738. The sounds 732 can be captured by a microphone on the electronic device, the light 734 can be capture using an optical sensor in the electronic device. The temperature 736 can be captured using a thermometer in the electronic device. The humidity 738 can be measured using a humidity sensor on the electronic device. The sounds 732, light 734, temperature 736 and humidity 738 can also be measured by other sensors within a proximity of the electronic device or determined through receiving general information about the area, such as a weather forecast for a specific city.

Figure 8:
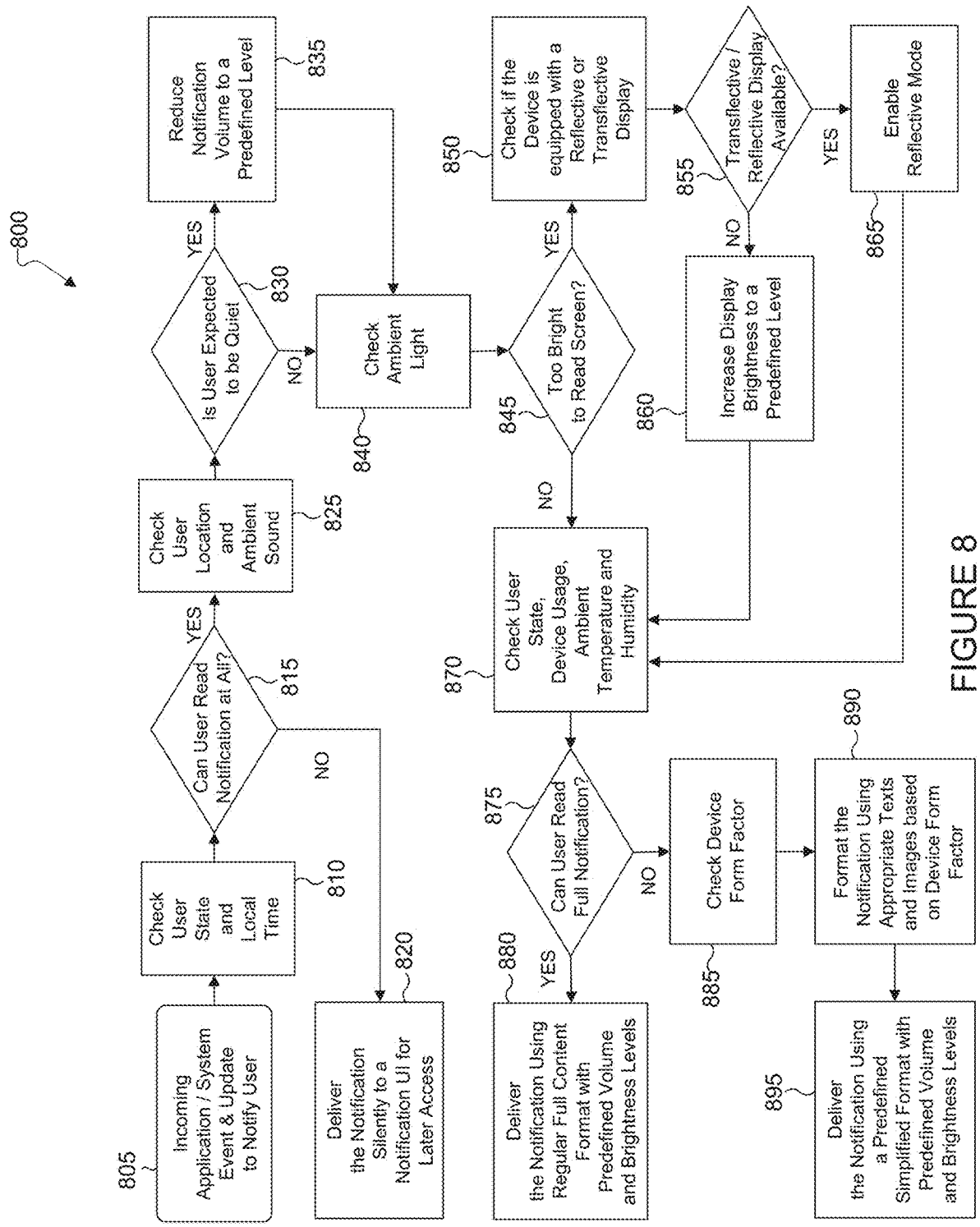
FIG. 8 illustrates an example flow chart for intelligent notification according to embodiments of the present disclosure.

FIG. 8 illustrates an example flow chart for intelligent notification 800 according to embodiments of the present disclosure. For example, the flow chart for intelligent notification 800 depicted in FIG. 8 may be performed by the electronic device 106-114 in FIG. 1, the electronic device 300 in FIG. 3, or intelligent notification engine 700 in FIG. 7.

In operation 805, the intelligent notification engine 700 receives an incoming application/system event & update to notify a user. In operation 810, the intelligent notification engine 700 checks a user state and local time. In operation 815, the intelligent notification engine 700 determines if the user can read the notifications. In operation 820, the intelligent notification engine 700 delivers the notification silently to a notification user interface for later access when the user is in a state to not read the notifications.

In operation 825, the intelligent notification engine 700 checks a user location and ambient sound when the user is in a state to read notifications. In operation 830, the intelligent notification engine 700 determines if the user is in a state to expect quietness. In operation 835, the intelligent notification engine 700 reduces notification volume to a predefined level when the user is in a state to expect quietness.

In operation 840, the intelligent notification engine 700 checks ambient light after the determination of the state of quietness. In operation 845, the intelligent notification engine 700 determines whether it is too bright to read the screen.

In operation 850, the intelligent notification engine 700 checks if the electronic device is equipped with a reflective or transflective display. In operation 855, the intelligent notification engine 700 determines whether the reflective or transflective display is available. In operation 860, the intelligent notification engine 700 increases a display brightness to a predefined level when the special displays are not available. In operation 865, the intelligent notification engine 700 enables a reflective mode when the special displays are available.

In operation 870, the intelligent notification engine 700 checks user state, device usage, ambient temperature and humidity. In operation 875, the intelligent notification engine 700 determines whether the user can read full notifications based on the user state, device usage, ambient temperature and humidity. In operation 880, the intelligent notification engine 700 delivers the notification using regular full content format with predefine volume and brightness levels based on the user being able to read full notifications. In operation 885, the intelligent notification engine 700 checks a device form factor. In operation 890, the intelligent notification engine 700 formats the notification using appropriate texts and images based on a device form factor. In operation 895, the intelligent notification engine 700 delivers the notification using a predefined simplified format with predefined volume and brightness level.

Although FIG. 8 illustrates an example flow chart for intelligent notification 800, various changes could be made to FIG. 8. For example, while shown as a series of steps, various steps in each figure could overlap, occur in parallel, occur in a different order, or occur multiple times.

Figure 9:
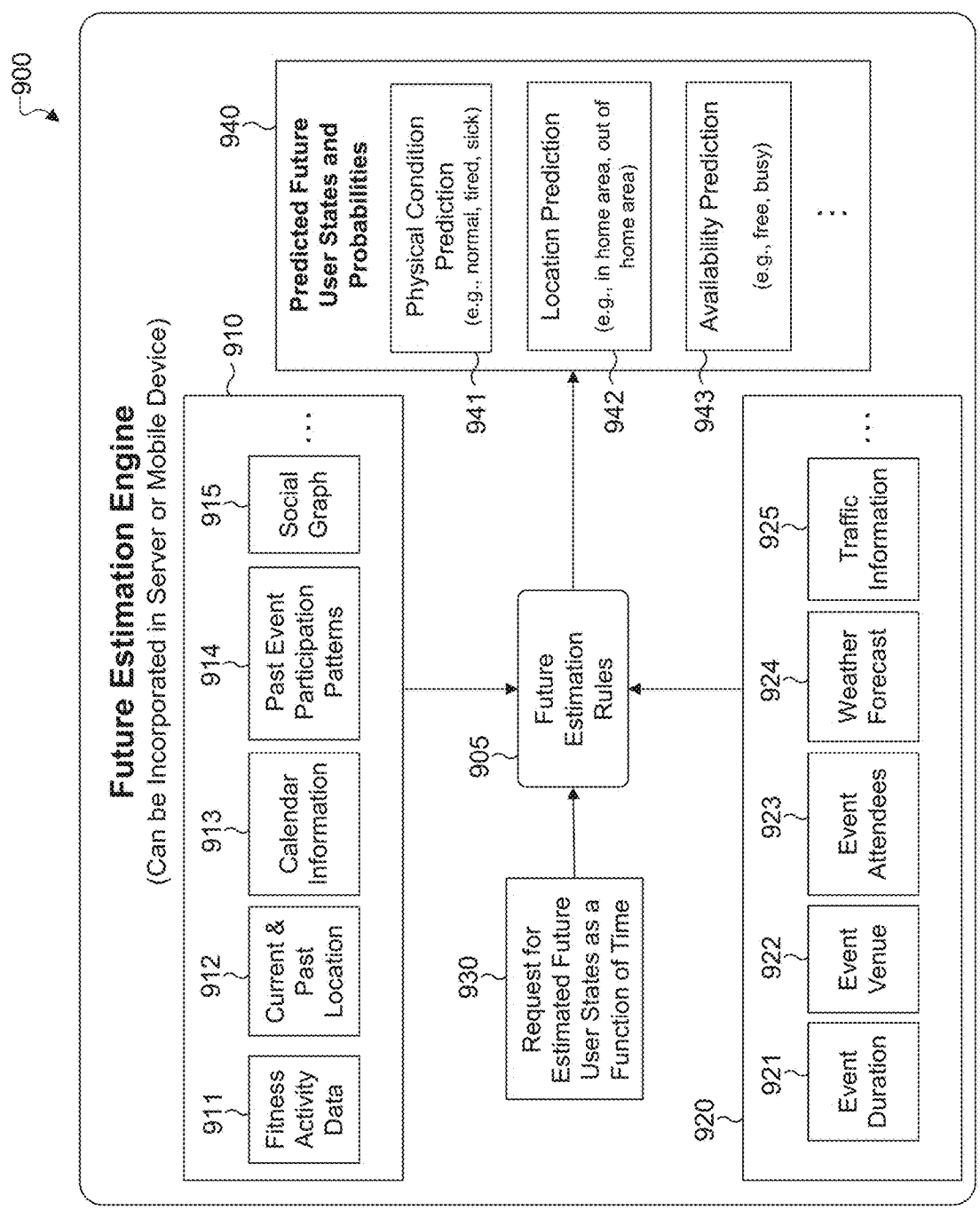
FIG. 9 illustrates an example future estimation engine block diagram according to embodiments of the present disclosure.

FIG. 9 illustrates an example future estimation engine 900 block diagram according to embodiments of the present disclosure. The embodiment of the intelligent future estimation engine 900 illustrated in FIG. 9 is for illustration only. FIG. 9 does not limit the scope of this disclosure to any particular embodiment of a future estimation engine.

The future estimation engine 900 includes future estimation rules 905, user context 910, event context 920, a request for estimated future user states as a function of time 930, and predicted future user states and probabilities 940. The future estimations engine 900 can by incorporated as a processor or physical controller in either the server 500 or an electronic device 300. The future estimation engine 900 determines the future user states and probabilities.

The user context 910 includes fitness activity data 911, current and past locations 912, calendar information 913, past event participation patterns 914, social graphs 915, and the like. The user context supplies the information related to user for determining the future user state and probabilities.

The fitness activity data 911 can be tracked using a fitness tracker or any electronic device with a heart rate monitor, step counter, and the like. The current & past location information 912 includes the current location, past location history, and projected locations. The calendar information 913 includes free and busy slots marked on a calendar. The past event participation pattern information 914 includes characteristics and attributes of past accepted, rejected, or dismissed events, with detail such as event location, event type, event venue, event weather, time of the day, day of the week, list of invitees, list of attendees, list of friends that attended, and the like; event acceptance, rejection and dismiss rates, such as including the overall statistics as well as a breakdown according to each event characteristic and attribute; and event no show rates, such as including the overall statistics as well as a breakdown according to each event characteristic and attribute and also showing event or activities in lieu of initially accepted events. The social graphs information 915 includes lists of current friends marked with degrees of separation, lists of friend whom the user has went to the same events with in the past, lists of non-friends whom the user has went to the same events with in the past; and lists of friends who share the common interest with the user, and the like.

The event context 920 includes an event duration 921, an event venue 922, event attendees 923, weather forecast 924, traffic information 925, and the like. The event duration information 921 includes typical durations for a specific activity. The event venue information 922 includes a list of events at the venue marked with corresponding event types; rating information; characteristics and attributes such as location, event type, availability information, reservation information, maximum occupancy, crime history, cost, and the like. The event attendees information 923 includes attendees currently at the event, attendees on their way to the event, total attendees for the event, attendees canceling or withdrawing from an event, and the like. The weather forecast information 924 includes the current weather for an event, previous weather for the event, predicted weather for the event. The traffic information 925 includes traffic information at previous similar events, the current traffic status, and future predicted or estimated traffic. All of the event information can be stored for a specific location of the event and alternative locations for the event. The individual users can request alteration to specific event information for approval or all current attendees or for future interest.

The predicted future user states and probabilities 940 includes a physical condition prediction 941, location prediction 942, and availability prediction 943. The physical condition prediction 941 is further described with FIG. 11, the location prediction is further described in FIG. 12 and the availability prediction 943 is further described in FIG. 10.

Figure 10:
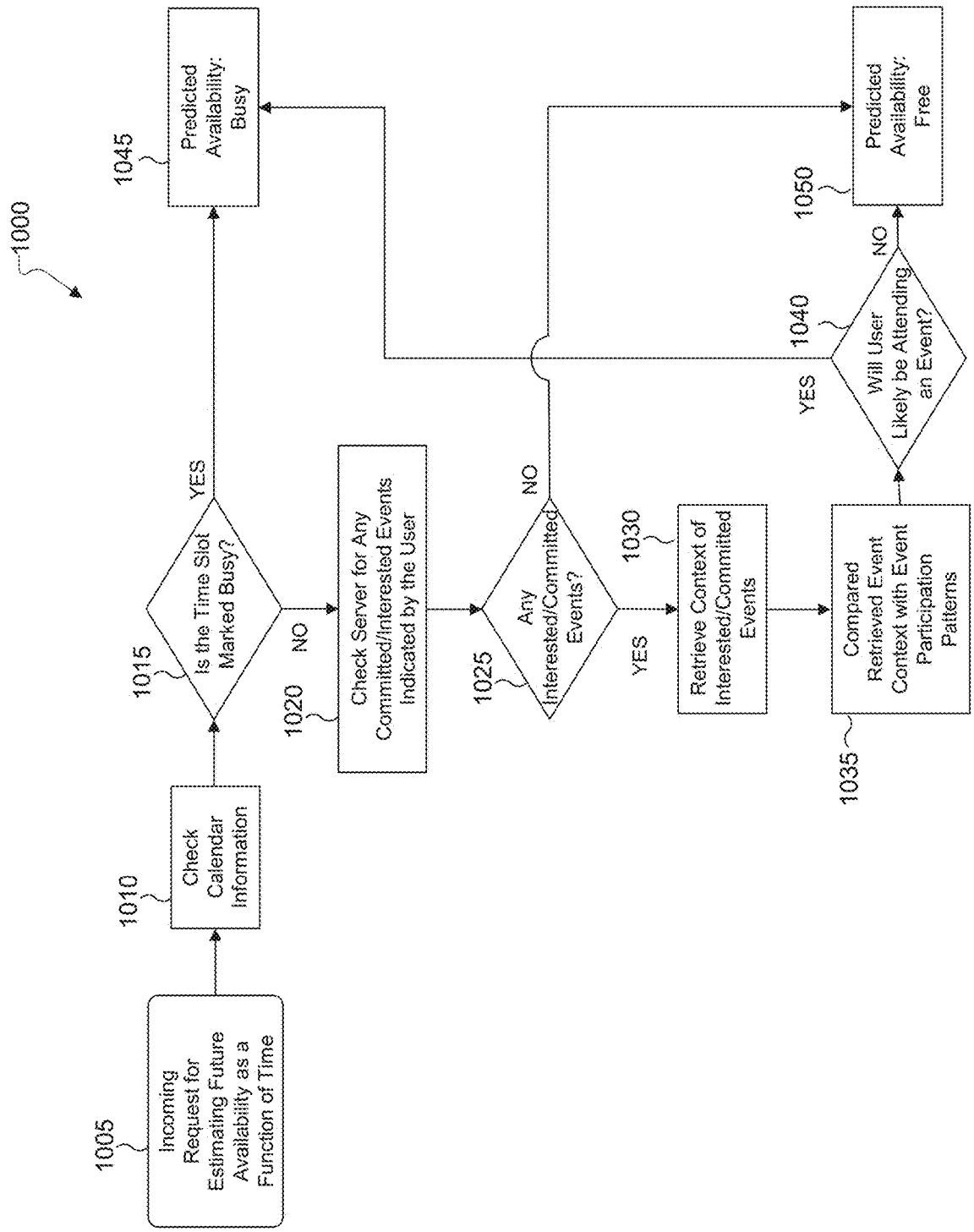
FIG. 10 illustrates an example future estimation rules flow chart for availability prediction according to embodiments of the present disclosure.

FIG. 10 illustrates an example future estimation rules flow chart for availability prediction 1000 according to embodiments of the present disclosure. For example, the future estimation rules flow chart for availability prediction 1000 depicted in FIG. 10 may be performed by the electronic device 106-114 in FIG. 1, the electronic device 300 in FIG. 3, or future estimation engine 900 in FIG. 9.

In operation 1005, the future estimation engine 900 receives a request for estimating future availability as a function of time. In operation 1010, the future estimation engine 900 checks calendar information. In operation 1015, the future estimation engine 900 determines whether the time slot is marked busy.

In operation 1020, the future estimation engine 900 checks the server for any committed/interested events indicated by the user when the time slot is marked busy. In operation 1025, the future estimation engine 900 determines whether there is a committed or interested event.

In operation 1030, the future estimation engine 900 retrieves the context of interest/committed events when the events are located on the server. In operation 1035, the future estimation engine 900 compares the retrieved events context with event participation patterns. In operation 1040, the future estimation engine 900 determines whether the user will likely be able to attend an event.

In operation 1045, the future estimation engine 900 predicts the availability as busy when the time slot is marked busy or when the user is likely to be attending an event. In operation 1050, the future estimation engine 900 predicts the availability as free when the time slot is not marked busy and the user will most likely not be attending an event.

Although FIG. 10 illustrates an example future estimation rules flow chart for availability prediction 1000, various changes could be made to FIG. 10. For example, while shown as a series of steps, various steps in each figure could overlap, occur in parallel, occur in a different order, or occur multiple times.

Figure 11:
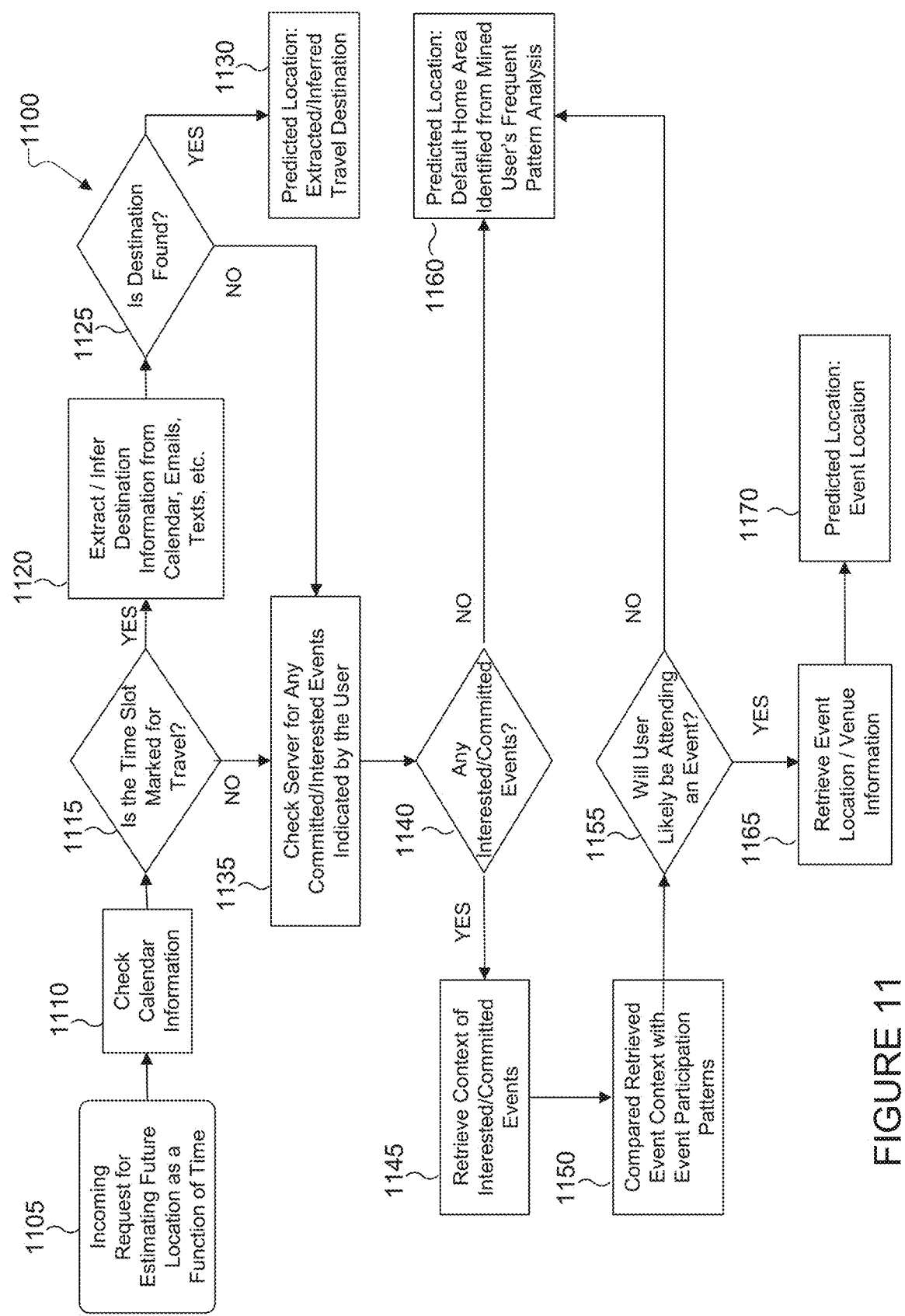
FIG. 11 illustrates an example future estimation rules flow chart for location prediction according to embodiments of the present disclosure.

FIG. 11 illustrates an example future estimation rules flow chart for location prediction 1100 according to embodiments of the present disclosure. For example, the future estimation rules flow chart for location prediction 1100 depicted in FIG. 11 may be performed by the electronic device 106-114 in FIG. 1, the electronic device 300 in FIG. 3, or future estimation engine 900 in FIG. 9.

In operation 1105, the future estimation engine 900 receives a request for estimating a future location as a function of time. In operation 1110, the future estimation engine 900 checks the calendar information. In operation 1115, the future estimation engine 900 determines whether the time slot is marked for travel.

In operation 1120, the future estimation engine 900 extracts or infers destination information from calendar, emails, text, and the like, when the time slot is marked for travel. In operation 1125, the future estimation engine 900 determines whether the destination is found. In operation 1130, the future estimation engine 900 predicts the location as the extracted or inferred travel destination.

In operation 1135, the future estimation engine 900 checks the server for any committed/interested events indicated by the user when the time slot is not marked for entry or when the destination is not found. In operation 1140, the future estimation engine 900 determines whether there are any interested or committed events in the calendar information.

In operation 1145, the future estimation engine 900 retrieves context of interested or committed events when there is an interested or committed event in the calendar information. In operation 1150, the future estimation engine 900 compares the retrieved event context with event participation patterns. In operation 1155, the future estimation engine 900 determines whether the user will likely be attending an event. In operation 1160, the future estimation engine 900 predicts the location as a default home area identified from mined user's frequent pattern analysis when it is determined that there are not interested committed events in the calendar information or when the user will likely not attend an event.

In operation 1165, the future estimation engine 900 retrieves event location or venue information when it is determined that the user will likely attend an event. In operation 1170, the future estimation engine 900 predicts the location as the event location.

Although FIG. 11 illustrates an example future estimation rules flow chart for location prediction 1100, various changes could be made to FIG. 11. For example, while shown as a series of steps, various steps in each figure could overlap, occur in parallel, occur in a different order, or occur multiple times.

Figure 12:
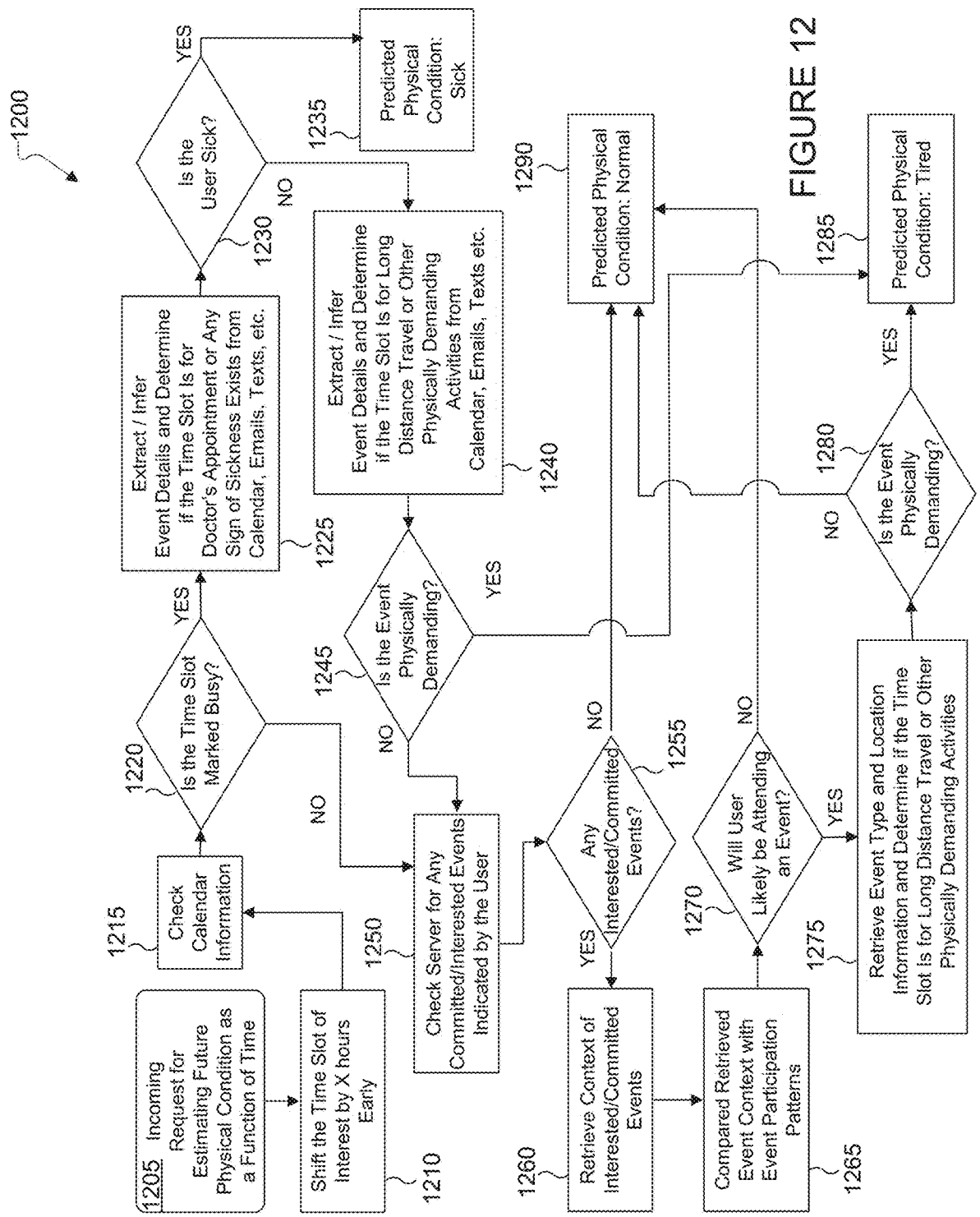
FIG. 12 illustrates an example future estimation rules flow chart for physical condition prediction according to embodiments of the present disclosure.

FIG. 12 illustrates an example future estimation rules flow chart for physical condition prediction 1200 according to embodiments of the present disclosure. For example, the future estimation rules flow chart for physical condition prediction 1200 depicted in FIG. 12 may be performed by the electronic device 106-114 in FIG. 1, the electronic device 300 in FIG. 3, or future estimation engine 900 in FIG. 9.

In operation 1205, the future estimation engine 900 receives a request for estimating a future physical condition as a function of time. In operation 1210, the future estimation engine 900 shifts the time slot of interest by x hours early. In operation 1215, the future estimation engine 900 checks the calendar information. In operation 1220, the future estimation engine 900 determines whether the time slot is marked busy.

In operation 1225, the future estimation engine 900 extracts or infers event details and determines if the time slot is for a doctor's appointment or any sign of sickness exists from the calendar, emails, texts, and the like, when the time slot is marked busy. In operation 1230, the future estimation engine 900 determines whether the user is sick using the extracted and inferred event details. In operation 1235, the future estimation engine 900 predicts the physical condition is sick based on the extracted and inferred event details.

In operation 1240, the future estimation engine 900 extracts or infers event details and determines if the time slot is for long distance travel or other physically demanding activities from the calendar, emails, texts, and the like, when the user is not determined is sick. In operation 1245, the future estimation engine 900 determines whether the event is physically demanding.

In operation 1250, the future estimation engine 900 checks the server for any committed or interested event indicated by the user when the time slot is not marked busy or when the event is not physically demanding. In operation 1255, the future estimation engine 900 determines whether the calendar information includes any interested or committed events.

In operation 1260, the future estimation engine 900 retrieves context of the interested or committed event when the calendar information includes an interested or committed event. In operation 1265, the future estimation engine 900 compares the retrieved event context with event participation patterns. In operation 1270, the future estimation engine 900 determines whether the user will likely be attending an event.

In operation 1275, the future estimation engine 900 retrieves event type and location information and determine if the time slot is for long distance travel or other physically demanding activities when the user will likely be attending an event. In operation 1280, the future estimation engine 900 determines whether the event is physically demanding. In operation 1285, the future estimation engine 900 predicts that the user is physically tired when the event is physically demanding. In operation 1290, the future estimation engine 900 predicts that the user's condition is normal when the event is not physically demanding, there are not any interested or committed events, or the user will likely not be attending an event.

Although FIG. 12 illustrates an example future estimation rules flow chart for physical condition prediction 1200, various changes could be made to FIG. 12. For example, while shown as a series of steps, various steps in each figure could overlap, occur in parallel, occur in a different order, or occur multiple times.

Figure 13:
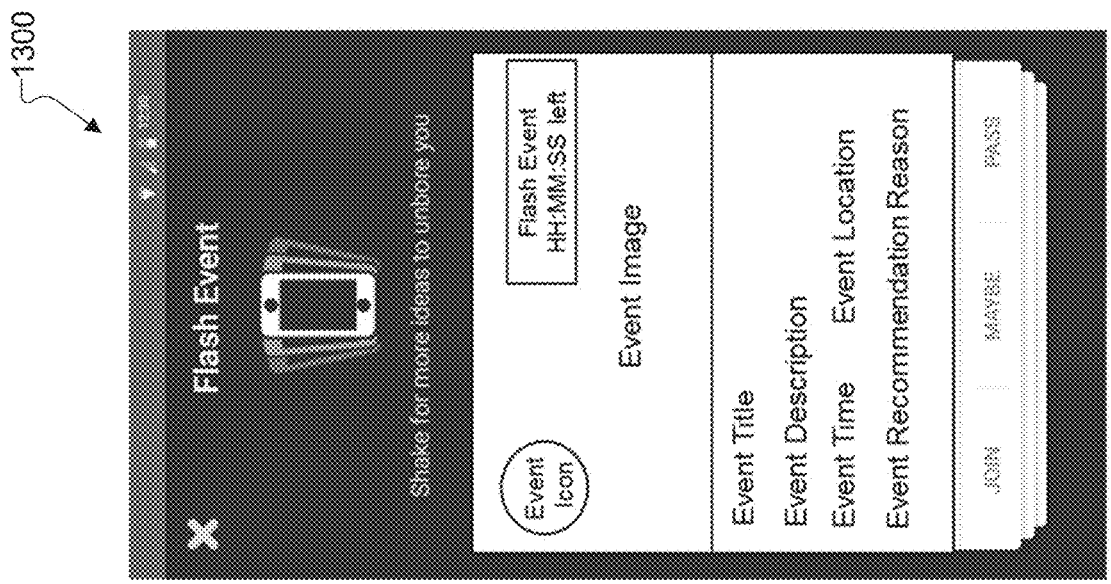
FIG. 13 illustrates an example a real-time flash event recommendation according to embodiments of the present disclosure.

FIG. 13 illustrates an example a real-time flash event recommendation 1300 according to embodiments of the present disclosure. The embodiment of the real-time flash event recommendation 1300 illustrated in FIG. 13 is for illustration only. FIG. 13 does not limit the scope of this disclosure to any particular embodiment of a real-time flash event recommendation 1300.

Figure 14:
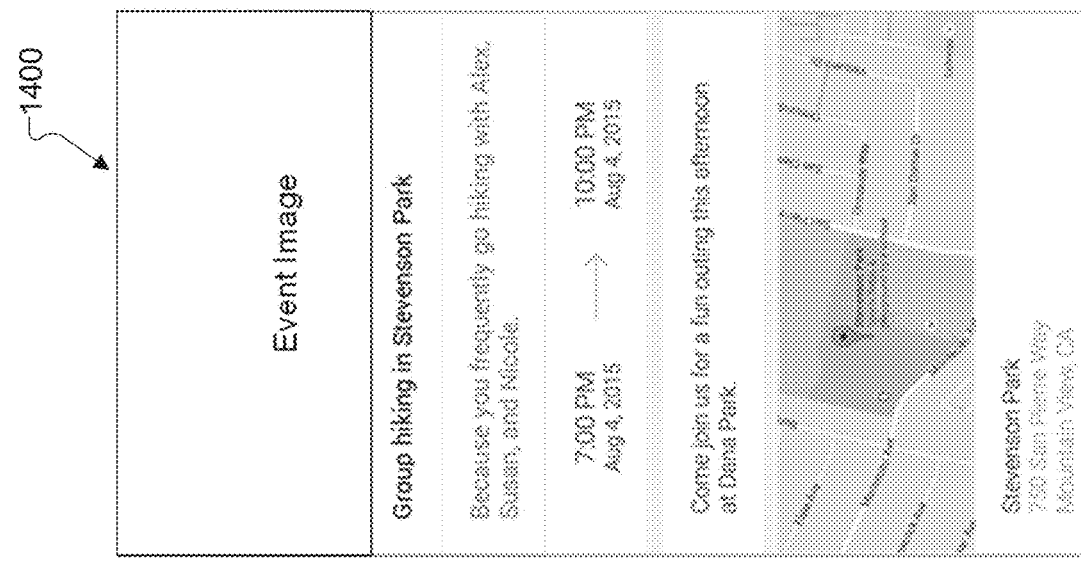
FIG. 14 illustrates an example artificial intelligence based event recommendation according to embodiments of the present disclosure.

FIG. 14 illustrates an example artificial intelligence based event recommendation 1400 according to embodiments of the present disclosure. The embodiment of the artificial intelligence based event recommendation 1400 illustrated in FIG. 14 is for illustration only. FIG. 14 does not limit the scope of this disclosure to any particular embodiment of an artificial intelligence based event recommendation 1400.

Figure 15:
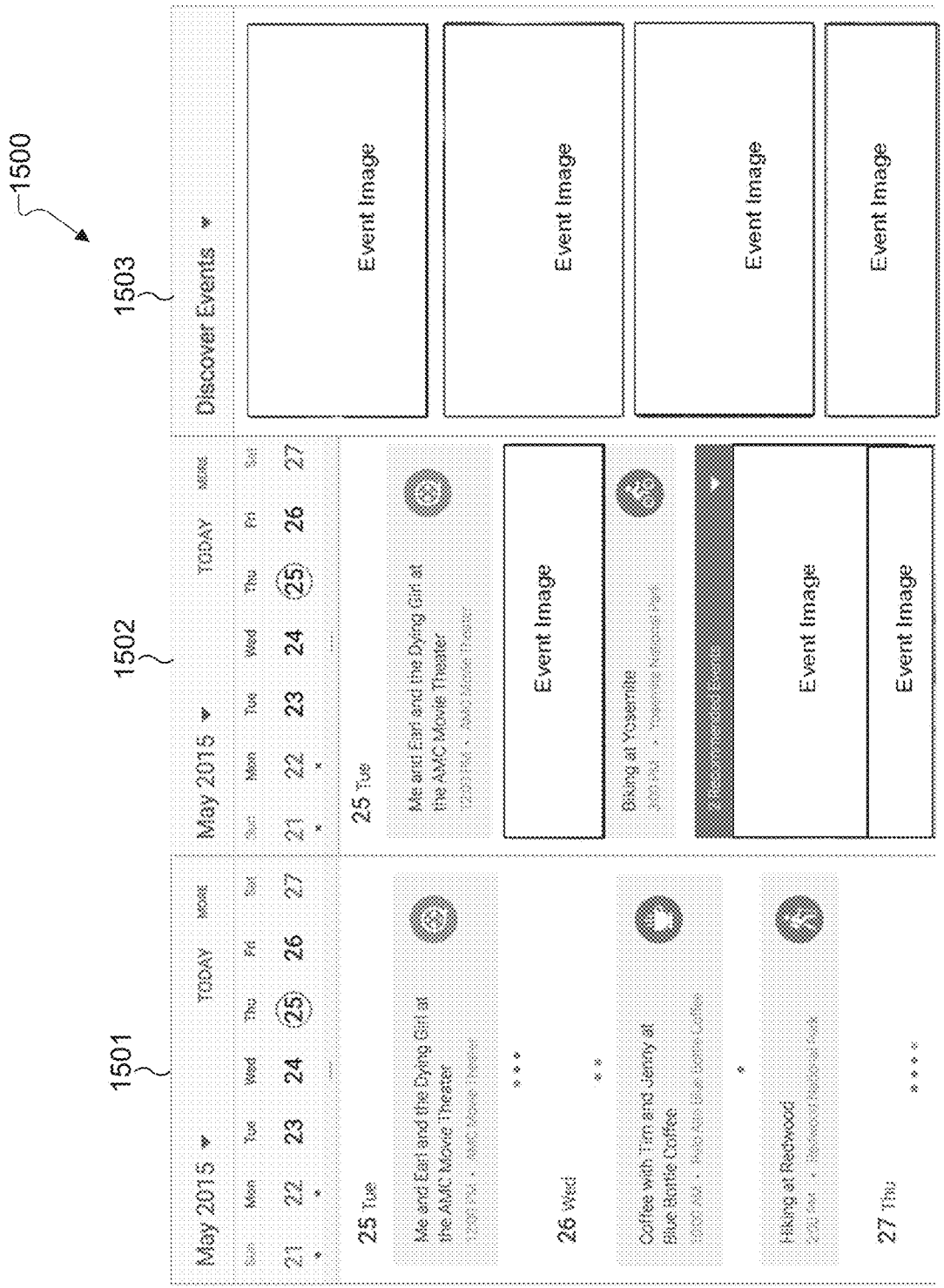
FIG. 15 illustrate an example in-calendar event recommendation according to embodiments of the present disclosure.

FIG. 15 illustrates an example in-calendar event recommendation 1500 according to embodiments of the present disclosure. The embodiment of the in-calendar event recommendation 1500 illustrated in FIG. 15 is for illustration only. FIG. 15 does not limit the scope of this disclosure to any particular embodiment of an in-calendar event recommendation. The user interface 1501 displays a number of events scheduled for the calendar. The user interface 1502 displays recommendations in empty time slots on the current day of the calendar. User interface 1503 display other recommended events for a user to add to the calendar.

Figure 16:
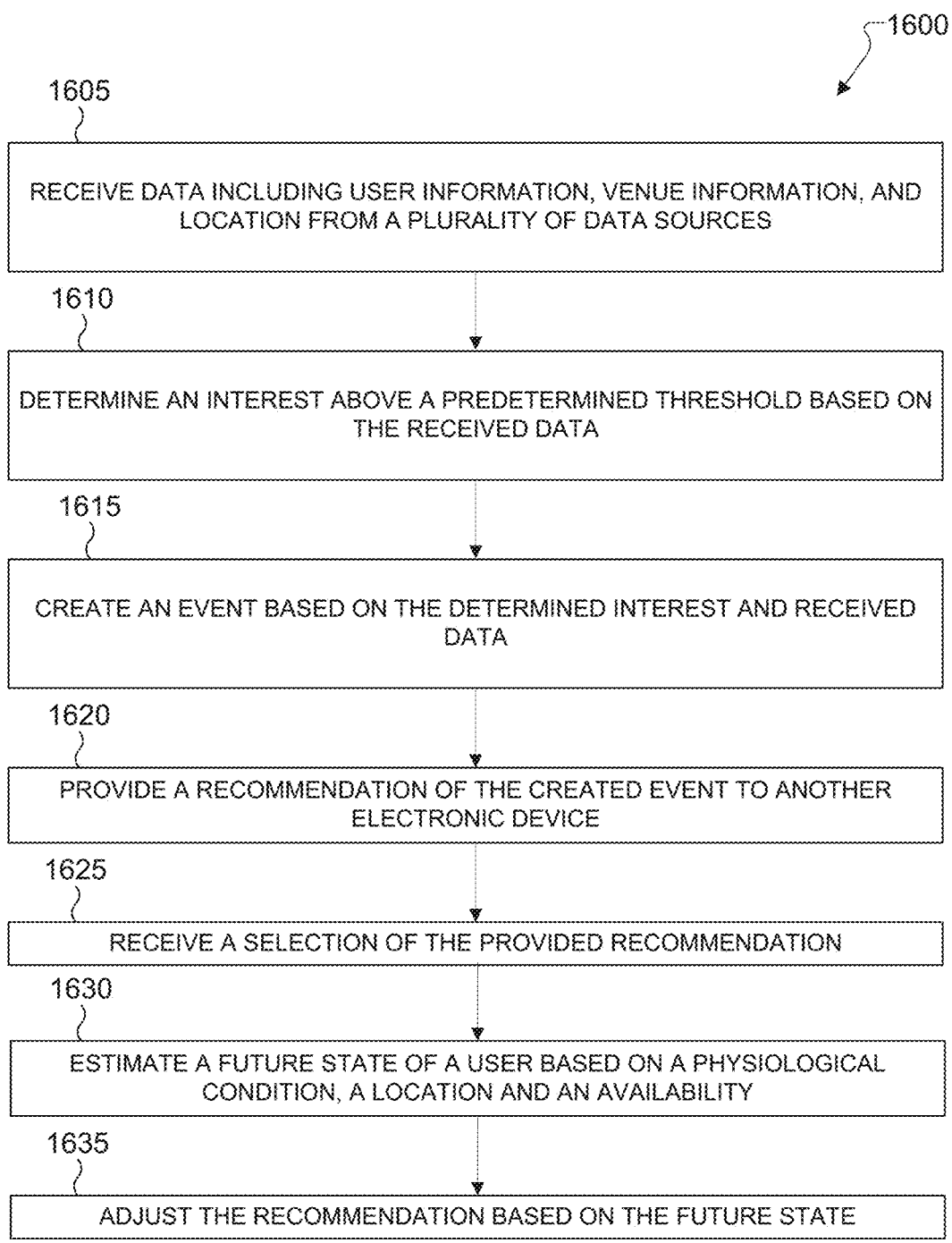
FIG. 16 illustrates an example process for automatically creating an instant ad-hoc calendar event according to embodiments of the present disclosure.

FIG. 16 illustrates an example process for automatically creating an instant ad-hoc calendar event 1600 according to embodiments of the present disclosure. For example, the process 1400 depicted in FIG. 14 may be performed by the electronic device 106-114 in FIG. 1 or the server 200 in FIG. 2.

In operation 1605, the server 200 receives data including user context information 910, venue context information (such as event duration 921, event venue 922, and event attendees 923), and location information (such as weather forecast 924 and traffic information 925) from a plurality of data sources.

In operation 1610, the server 200 determines an interest above a predetermined threshold based on the received data. The server 200 can receive or detect a request or need for an event recommendation. The server can detect when a user is bored based on different activity on the phone, such as non-movement for a period of time, excessive swiping or phone usage, and the like.

In operation 1615, the server 200 creates an event based on the determined interest and received data. The server 200 can use the future estimation rules 905 for determining events to recommend.

In operation 1620, the server 200 provides a recommendation of the created event to another electronic device. The server 200 can provide the recommendation of the event to multiple devices. The server 200 can provide updates on the recommendation as other users indicate their interest or disinterest.

In operation 1625, the server 200 receives a selection of the provided recommendation. The electronic device can select a specific recommended event and notify the server 200. The server 200 then can update the other users of the event that have not denied or refused the recommendations. In other words, the only users updated have either accepted the recommendation for the event or have not responded. The list of users that receive updates can also be set to a specific time before the event or that are currently viewing the recommendation.

In operation 1630, the server 200 estimates a future state of a user based on a physiological condition, a location and an availability. The server 200 can determine that the user is physically tired, currently located too far away, or something other event came up, to alter the recommendations.

In operation 1640, the server 200 adjusts the recommendations based on the future state. The server 200 can make different recommendations or adjust the time/location of an event based on the future state. For example, if it is raining at the location of an event, the event can be moved to a different location or altered to a different type of event.

Although FIG. 16 illustrates an example automatically creating an instant ad-hoc calendar event 1600, various changes could be made to FIG. 16. For example, while shown as a series of steps, various steps in each figure could overlap, occur in parallel, occur in a different order, or occur multiple times.

Figure 17:
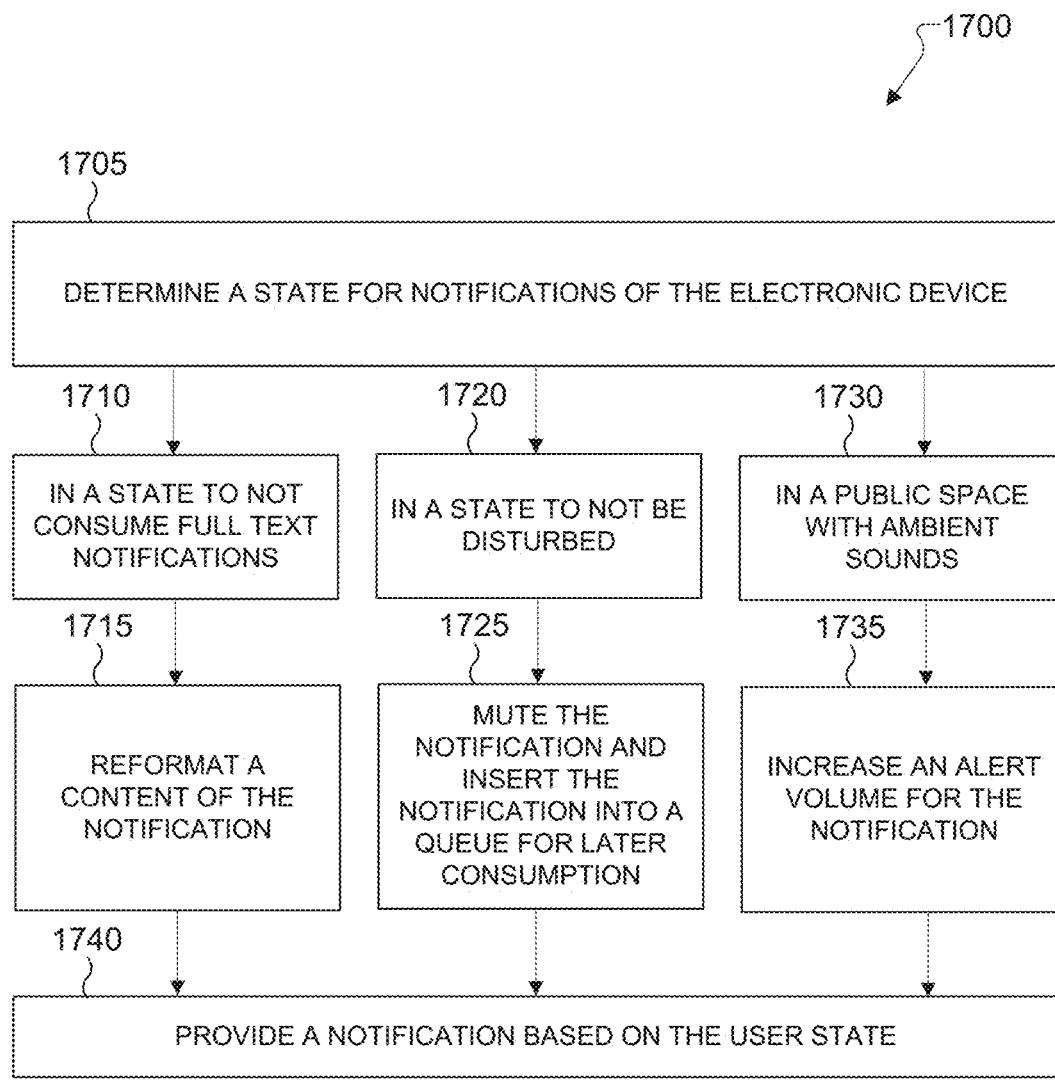
FIG. 17 illustrates an example process for intelligent notification according to embodiments of the present disclosure.

FIG. 17 illustrates an example process for intelligent notification 1700 according to embodiments of the present disclosure. For example, the process for intelligent notification 1700 depicted in FIG. 17 may be performed by the electronic device 106-114 in FIG. 1 or the server 200 in FIG. 2.

In operation 1705, the server 200 determines a state of notification of the electronic device. The electronic device can be set to silent, normal, and the like.

In operation 1710, the server 200 determines that the electronic device is not in a state where a user is to consume full text notifications. In operation 1715, the server 200 reformats a content of the notification based on the electronic device being in a state to not consume full text notifications.

In operation 1720, the server 200 determines that the electronic device is in a state where the user is to not be disturbed. In operation 1725, the server 200 mutes the text notification and inserts the notification into a queue for later consumption based on the electronic device being in a state to not be disturbed.

In operation 1730, the server 200 determines that the electronic device is in a public space with ambient sounds. In operation 1735, the server 200 increases an alert volume for the notification.

In operation 1740, the server 200 provides a notification based on the user state. The server 200 provides the notification in a normal state when the electronic device is not determined to be in a special state, such as a state to not consume full texts, a state to not be disturbed, a state of located in a public space with ambient sounds, and the like.

Although FIG. 17 illustrates an example process for intelligent notification 1700, various changes could be made to FIG. 17. For example, while shown as a series of steps, various steps in each figure could overlap, occur in parallel, occur in a different order, or occur multiple times.

Figure 18:
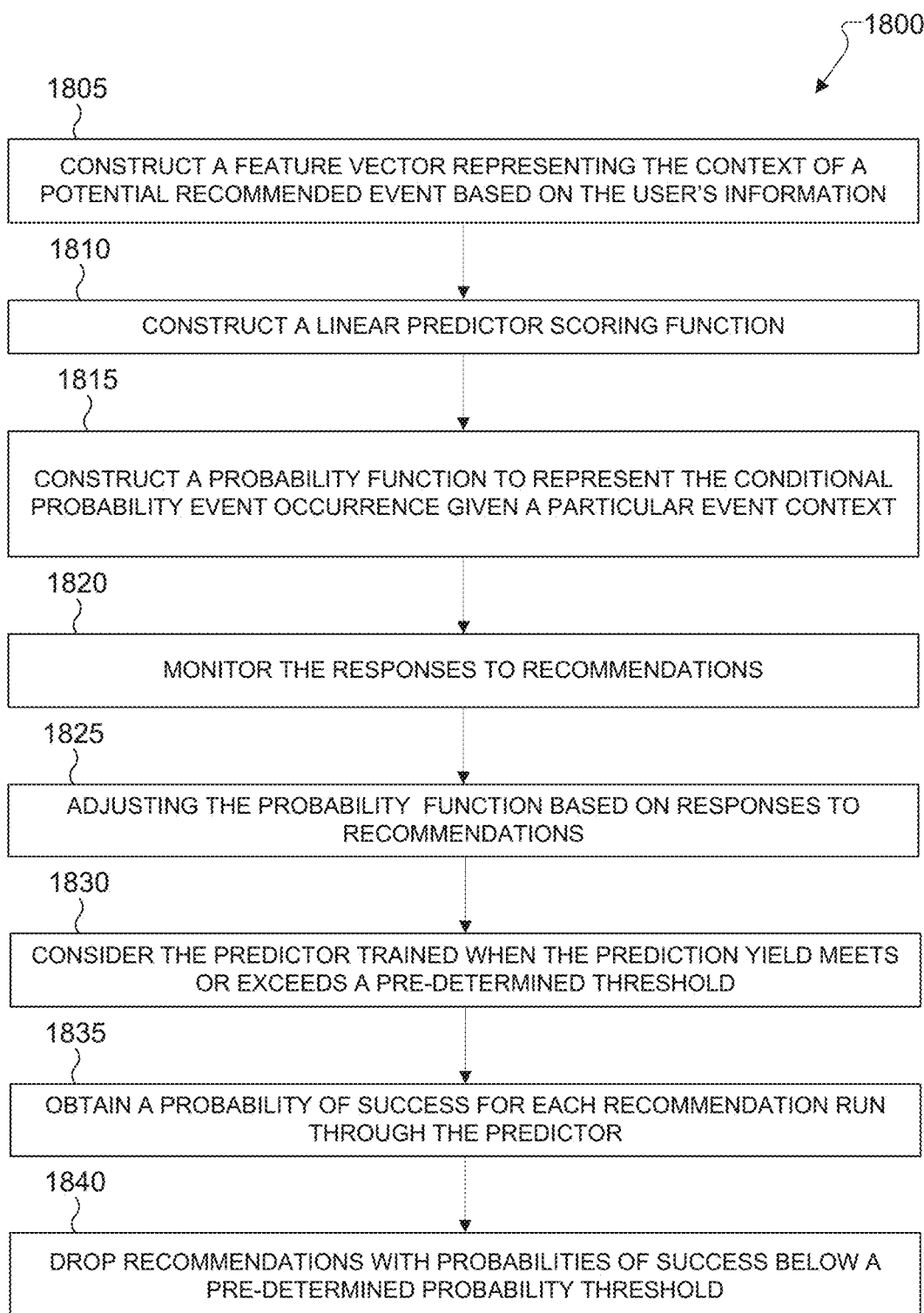
FIG. 18 illustrates an example process for event ranking according to embodiments of the present disclosure.

FIG. 18 illustrates an example process for event ranking 1800 according to embodiments of the present disclosure. For example, the process for event ranking 1800 depicted in FIG. 18 may be performed by the electronic device 106-114 in FIG. 1 or the server 200 in FIG. 2.

In operation 1805, the server 200 constructs a feature vector representing the context of a potential recommended event based on the user's information. Construct an n-dimensional feature vector(u) representing the context of potential recommended events based on the user's information collected by the server. The event context can include but is not limited to location, type of the event, time of the day, day of the week, shared interests among users divided into groups, average attendance rates, and the rate of dismissing past flash event recommendations.

In operation 1810, the server 200 constructs a linear predictor scoring function. Constructing a linear predictor scoring function using Score=$\sum_{i=1}^{n} w_i f_i(u)$ to represent the likelihood of the recommended events being accepted by the user, where $w_i$ are weights applied to the features during the training process.

In operation 1815, the server 200 constructs a probability function to represent the conditional probability event occurrence given a particular event context. Construct a probability function to represent the conditional probability of event occurrence given a particular event context (e.g., a pick-up soccer event in Mountain View on Saturday 3 pm and the like.) by normalizing the scoring function as follows:

$$P(o|c) = \frac{\exp\left[\sum_{i=1}^{n} w_i f_i(u)\right]}{\sum \exp\left[\sum_{i=1}^{n} w_i f_i(u)\right]}$$

where P( ) is the probability of event occurrence and $w_i$ is the weight for an event.

In operation 1820, the server 200 monitors the responses to recommendations. To begin training, weights are initially assigned with random values. Each time the server pushes a recommended event with a specific context to users, if the event happens successfully (i.e., users accepted and attended the event), the server labels this recommended event as true. Otherwise, the server labels it as false.

In operation 1825, the server 200 adjusts the probability function based on responses to recommendations. As the predictor is trained with more event occurrence history, if the prediction is inaccurate, the server runs gradient decent to adjust the weights. Overtime, the weights will gradually converge and yields a more accurate prediction.

In operation 1830, the server 200 considers the predictor trained when the prediction yield meets or exceeds a pre-determined threshold. Once the prediction yielded by the model meets or exceeds a pre-determined threshold, the predictor is considered trained.

In operation 1835, the server 200 obtains a probability of success for each recommendation run through the predictor. At run time, when the server determines it could create multiple recommended events, the server can run each recommended event with the predictor and obtains the probability of success. It can then rank all recommended events according to their probability and push the recommendations with the highest probability first.

In operation 1840, the server 200 drops recommendations with probabilities of success below a pre-determined probability threshold. The server also can set a pre-determined probability threshold below which the server will drop it and never push to users.

Although FIG. 18 illustrates an example process for intelligent notification 1800, various changes could be made to FIG. 18. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   a storage configured to store an electronic calendar and data including user information, venue information, and location information received from a plurality of data sources including the electronic calendar;
   a transceiver; and
   a processor coupled to the transceiver and the storage, the processor configured to:
      receive information related to activities performed on a plurality of other electronic devices related to a plurality of other users;
      detect that at least one user is bored based on the activities performed on the plurality of other electronic devices;
      in response to detecting that the at least one user is bored, determine an interest above a predetermined threshold based on the stored data;
      create a calendar event based on the determined interest and stored data;
      provide a recommendation of the created calendar event to the plurality of other electronic devices;
      receive a negative response to the provided recommendation from at least one of the other electronic devices;
      create a different calendar event for the electronic calendar based on the received negative response;
      provide an alternate recommendation for the different calendar event to the plurality of other electronic devices; and
      add the different calendar event to the electronic calendar.

2. The electronic device of claim 1, wherein the processor is further configured to provide a notification on the provided recommendation based on the user information, device information, and ambient information from the electronic device.

3. The electronic device of claim 2, wherein the processor is further configured to:
   determine a state for notifications of the electronic device.

4. The electronic device of claim 3, wherein the processor is further configured to:
   when the electronic device is not in a state where a user is to consume full text notifications, reformat a content of the notification, wherein the reformatted content includes increasing a size of an icon, text or other representative image corresponding to the recommendation; and
   when the electronic device is in a state where the user is not to be disturbed, mute the notification and insert the notification into a queue for later consumption.

5. The electronic device of claim 2, wherein the processor is further configured to:
   when the electronic device is in a public space with ambient sounds, increase an alert volume of the notification.

6. The electronic device of claim 1, wherein the processor is further configured to:
   estimate a future state of a user based on a physiological condition, a location, and an availability; and
   adjust the recommendation based on the estimated future state.

7. The electronic device of claim 6, wherein:
   the physiological condition is estimated based on physical exertion of calendar events attended prior to the recommendation;
   the location is estimated based on locations of prior calendar events attended and distance from a home location; and
   the availability is estimated based on distance from prior calendar events to the recommendation and later calendar events to the recommendation.

8. A method for operating an electronic device, the method comprising:
   storing data including user information, venue information, and location information received from a plurality of data sources including an electronic calendar;
   receiving information related to activities performed on a plurality of other electronic devices related to a plurality of other users;
   detecting that at least one user is bored based on the activities performed on the plurality of other electronic devices;
   in response to detecting that the at least one user is bored, determining an interest above a predetermined threshold based on the stored data;
   creating a calendar event based on the determined interest and stored data;
   providing a recommendation of the created calendar event to the plurality of other electronic devices;
   receiving a negative response to the provided recommendation from at least one of the other electronic devices;
   creating a different calendar event for the electronic calendar based on the received negative response;
   providing an alternate recommendation for the different calendar event to the plurality of other electronic devices; and
   adding the different calendar event to the electronic calendar.

9. The method of claim 8, further comprising providing a notification on the provided recommendation based on the user information, device information, and ambient information from the electronic device.

10. The method of claim 9, further comprising:
    determining a state for notifications of the electronic device.

11. The method of claim 10, further comprising:
    when the electronic device is not in a state where a user is to consume full text notifications, reformatting a content of the notification, wherein the reformatted content includes increasing a size of an icon, text or other representative image corresponding to the recommendation; and
    when the electronic device is in a state where the user is not to be disturbed, muting the notification and inserting the notification into a queue for later consumption.

12. The method of claim 9, further comprising:
    when the electronic device is in a public space with ambient sounds, increasing an alert volume of the notification.

13. The method of claim 8, further comprising:
    estimating a future state of a user based on a physiological condition, a location, and an availability; and
    adjusting the recommendation based on the estimated future state.

14. The method of claim 13, wherein:
the physiological condition is estimated based on physical exertion of calendar events attended prior to the recommendation;
the location is estimated based on locations of prior calendar events attended and distance from a home location; and
the availability is estimated based on distance from prior calendar events to the recommendation and later calendar events to the recommendation.

15. A non-transitory computer readable medium embodying a computer program, the computer program comprising computer readable program code that when executed causes at least one processor to:
store data including user information, venue information, and location information received from a plurality of data sources including an electronic calendar on an electronic device;
receive information related to activities performed on a plurality of other electronic devices related to a plurality of other users;
detect that at least one user is bored based on the activities performed on the plurality of other electronic devices;
in response to detecting that the at least one user is bored, determine an interest above a predetermined threshold based on the stored data;
create a calendar event based on the determined interest and stored data;
provide a recommendation of the created calendar event to the plurality of other electronic devices;
receive a negative response to the provided recommendation from at least one of the other electronic devices;
create a different calendar event for the electronic calendar based on the received negative response;
provide an alternate recommendation for the different calendar event to the plurality of other electronic devices; and
add the different calendar event to the electronic calendar.

16. The non-transitory computer readable medium of claim 15, wherein the computer readable program code when executed further causes the at least one processor to:
provide a notification on the provided recommendation based on the user information, device information, and ambient information from the electronic device.

17. The non-transitory computer readable medium of claim 16, wherein the computer readable program code when executed further causes the at least one processor to:
determine a state for notifications of the electronic device.

18. The non-transitory computer readable medium of claim 17, wherein the computer readable program code when executed further causes the at least one processor to:
when the electronic device is not in a state where a user is to consume full text notifications, reformat a content of the notification, wherein the reformatted content includes increasing a size of an icon, text or other representative image corresponding to the recommendation;
when the electronic device is in a state where the user is not to be disturbed, mute the notification and insert the notification into a queue for later consumption; and
when the electronic device is in a public space with ambient sounds, increase an alert volume of the notification.

19. The non-transitory computer readable medium of claim 15, wherein the computer readable program code when executed further causes the at least one processor to:
estimate a future state of a user based on a physiological condition, a location, and an availability; and
adjust the recommendation based on the estimated future state.

20. The non-transitory computer readable medium of claim 19, wherein:
the physiological condition is estimated based on physical exertion of calendar events attended prior to the recommendation;
the location is estimated based on locations of prior calendar events attended and distance from a home location; and
the availability is estimated based on distance from prior calendar events to the recommendation and later calendar events to the recommendation.

* * * * *